US012791915B2

(12) United States Patent
Chen et al.

(10) Patent No.: US 12,791,915 B2
(45) **Date of Patent: *Nov. 10, 2026**

(54) LIGHT PASS APERTURE MODULE, CAMERA MODULE AND ELECTRONIC DEVICE

(71) Applicant: LARGAN PRECISION CO., LTD., Taichung City (TW)

(72) Inventors: Hao Jan Chen, Taichung City (TW); Yu Chen Lai, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 165 days.

This patent is subject to a terminal disclaimer.

(21) Appl. No.: 18/799,208

(22) Filed: Aug. 9, 2024

(65) Prior Publication Data

US 2024/0402574 A1 Dec. 5, 2024

Related U.S. Application Data

(63) Continuation of application No. 18/218,396, filed on Jul. 5, 2023, now Pat. No. 12,105,410, which is a continuation of application No. 17/901,423, filed on Sep. 1, 2022, now Pat. No. 11,733,588.

(60) Provisional application No. 63/346,294, filed on May 26, 2022.

(51) Int. Cl.
*G03B 9/22* (2021.01)
*G03B 17/02* (2021.01)

(52) U.S. Cl.
CPC ............... *G03B 9/22* (2013.01); *G03B 17/02* (2013.01)

(58) Field of Classification Search
CPC . G03B 9/22; G03B 17/02; G03B 9/12; G03B 9/18; G03B 9/06; G03B 9/10
See application file for complete search history.

(56) References Cited

U.S. PATENT DOCUMENTS 5,335,036 A 8/1994 Aoshima
8,282,294 B2 10/2012 Hirabayashi
8,542,424 B2 9/2013 Abe et al.
(Continued)

FOREIGN PATENT DOCUMENTS

CN 102621769 A * 8/2012 ............... G03B 9/06
CN 108181775 A 6/2018
(Continued)

OTHER PUBLICATIONS

EP Office Action dated Aug. 13, 2025 as received in Application No. 23164369.3.

(Continued)

*Primary Examiner* — Christopher E Mahoney
(74) *Attorney, Agent, or Firm* — Maschoff Brennan

(57) ABSTRACT

A light pass aperture module, in order along a central axis, includes a blade assembly and a cap. The blade assembly includes a plurality of blades. The blades form a light pass aperture, and the light pass aperture is variable in size with the central axis as a center. The cap covers the blade assembly. The cap has a through hole, and the through hole is disposed corresponding to the light pass aperture. The cap includes a surface level down structure. The surface level down structure is disposed corresponding to one of the blades, and the surface level down structure is closer to the one blade than the through hole.

19 Claims, 27 Drawing Sheets

(56) References Cited

U.S. PATENT DOCUMENTS

| | | | |
|---|---|---|---|
| 10,444,599 | B2 | 10/2019 | Park et al. |
| 10,506,146 | B2 | 12/2019 | Seo et al. |
| 10,564,516 | B2 | 2/2020 | Lee |
| 10,571,648 | B2 | 2/2020 | Lee |
| 10,848,656 | B2 | 11/2020 | Park et al. |
| 10,852,623 | B2 | 12/2020 | Kim et al. |
| 10,969,653 | B2 | 4/2021 | Kim et al. |
| 10,969,654 | B2 | 4/2021 | Seo et al. |
| 11,226,539 | B2 | 1/2022 | Jun |
| 11,283,976 | B2 | 3/2022 | Yu et al. |
| 11,733,588 | B1 | 8/2023 | Chen et al. |
| 2011/0164297 | A1 | 7/2011 | Abe et al. |
| 2020/0241387 | A1 | 7/2020 | Seo et al. |
| 2022/0382128 | A1 | 12/2022 | Lee |
| 2023/0341746 | A1 | 10/2023 | Chen et al. |

FOREIGN PATENT DOCUMENTS

| | | | | | |
|---|---|---|---|---|---|
| CN | 108933886 | A | | 12/2018 | |
| CN | 110579925 | A | | 12/2019 | |
| CN | 110579926 | A | | 12/2019 | |
| CN | 110858048 | A | | 3/2020 | |
| CN | 109413306 | B | | 10/2020 | |
| CN | 112099225 | A | | 12/2020 | |
| CN | 112147772 | A | | 12/2020 | |
| CN | 112262566 | A | | 1/2021 | |
| CN | 112596321 | A | | 4/2021 | |
| CN | 108696677 | B | | 6/2021 | |
| CN | 113259545 | A | | 8/2021 | |
| CN | 114285242 | A | | 4/2022 | |
| CN | 217484662 | U | | 9/2022 | |
| CN | 218630459 | U | | 3/2023 | |
| EP | 4 332 675 | A1 | | 3/2024 | |
| JP | H05-90459 | U | | 12/1993 | |
| JP | 2856590 | B2 | | 2/1999 | |
| JP | 2006-337947 | A | | 12/2006 | |
| JP | 2009-195084 | A | | 8/2009 | |
| KR | 20110019503 | A | * | 2/2011 | ............... G03B 9/14 |

OTHER PUBLICATIONS

CN Office Action dated Aug. 23, 2025 as received in Application No. 202210915815.7.

BR Office Action dated Sep. 11, 2025 as received in Application No. 102023008697-7.

Extended European Search Report dated Oct. 13, 2023 as received in Application No. 23164369.3.

* cited by examiner

LIGHT PASS APERTURE MODULE, CAMERA MODULE AND ELECTRONIC DEVICE

RELATED APPLICATIONS

This application is a continuation application of U.S. patent application Ser. No. 18/218,396, filed on Jul. 5, 2023, which is a continuation application of U.S. patent application Ser. No. 17/901,423, filed on Sep. 1, 2022, which claims priority to U.S. Provisional Patent Application No. 63/346,294, filed on May 26, 2022, which is incorporated by reference herein in its entirety.

BACKGROUND

Technical Field

The present disclosure relates to a light pass aperture module, a camera module and an electronic device, more particularly to a light pass aperture module and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

Recently, camera modules are applied to electronic devices in more fields than ever, such as portable devices (e.g., smartphones, action cameras), augmented reality (AR) or virtual reality (VR) head-mounted devices and aerial cameras. Moreover, the hardware used in the camera modules are continuously upgraded, for example, larger image sensors and imaging lenses with better image quality. A larger image sensor provides better image quality, but the background in the picture may become blurry. Conventionally, a variable aperture stop can be used to adjust the blur degree of the background and controlling the amount of incident light. However, since the variable aperture stop is achieved by movement of multiple blades which constitute a blade assembly, bias of the center of the variable aperture stop or light leakage may occur because some blades usually float upward, rendering image quality deterioration.

SUMMARY

According to one aspect of the present disclosure, a light pass aperture module, in order along a central axis, includes a blade assembly and a cap. The blade assembly includes a plurality of blades. The blades form a light pass aperture, and the light pass aperture is variable in size with the central axis as a center. The cap covers the blade assembly. The cap has a through hole, and the through hole is disposed corresponding to the light pass aperture. The cap includes a surface level down structure. The surface level down structure is disposed corresponding to one of the blades, and the surface level down structure is closer to the one blade than the through hole.

In a direction parallel to the central axis, when a gap between the surface level down structure and the one of the plurality of blades is Gap, and a thickness of the one of the plurality of blades is Thi, the following condition is satisfied:

$$0.001 \leq Gap/Thi \leq 0.995.$$

According to another aspect of the present disclosure, a camera module includes the abovementioned light pass aperture module and a lens assembly. The lens assembly is disposed corresponding to the light pass aperture in the central axis.

According to another aspect of the present disclosure, an electronic device includes the abovementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
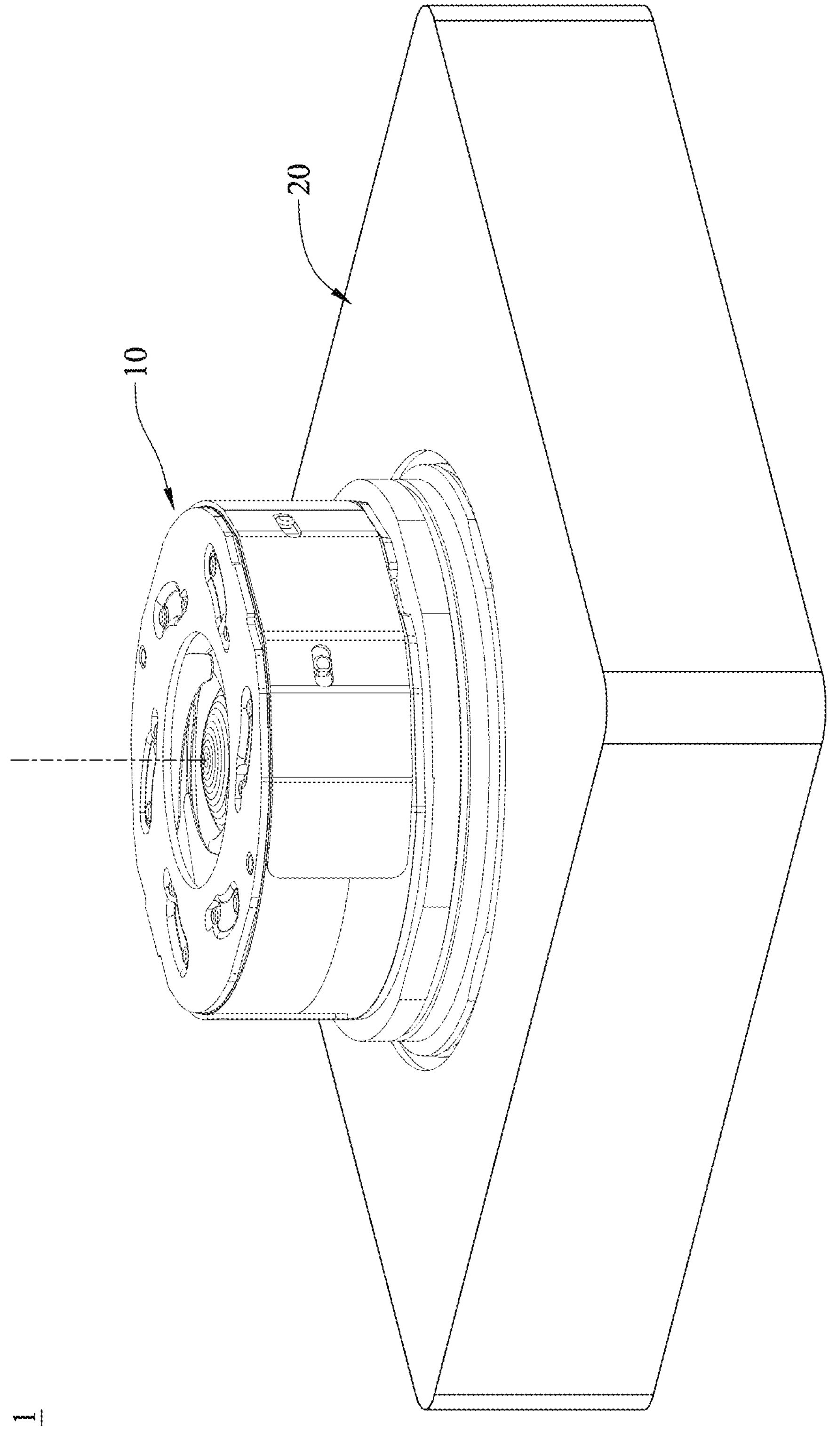
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a light pass aperture module. The light pass aperture module, in order along a central axis, preferably includes a blade assembly and a cap. The blade assembly preferably includes a plurality of blades together surrounding to define a light pass aperture, and the light pass aperture is preferably variable in size with the central axis as a center. The cap preferably covers the blade assembly. The cap preferably has a through hole disposed corresponding to the light pass aperture. The cap preferably includes a surface level down structure, the surface level down structure is preferably disposed corresponding to one of the blades, and the surface level down structure is preferably closer to the blade than the through hole. Therefore, the surface level down structure can prevent the blade from floating upward during its rotation so as to ensure a stable rotation path for the blade, thereby preventing bias of the light pass aperture or light leakage.

In a direction parallel to the central axis, when a gap between the surface level down structure and the blade is Gap, and a thickness of the blade is Thi, the following condition is preferably satisfied: $0.001 \leq Gap/Thi \leq 0.995$. A proper gap therebetween is favorable for ensuring accurate position of the light pass aperture while improving path stability. Moreover, the following condition can also be satisfied: $0.01 \leq Gap/Thi \leq 0.9$. Moreover, the following condition can also be satisfied: $0.05 \leq Gap/Thi \leq 0.8$.

The cap preferably includes a surface sub-level down structure, and the surface sub-level down structure is preferably disposed corresponding to another blade. In the direction parallel to the central axis, the surface sub-level down structure is preferably closer to the cap than the surface level down structure. A difference in depth between the surface sub-level down structure and the surface level down structure results in a gap between different blades in the direction parallel to the central axis, which is favorable for preventing any friction between the blades during their rotation.

The cap is preferably a stamped element. Therefore, it is favorable for reducing the weight of the cap so as to prevent affecting the driving of the camera module. Moreover, the cap is preferably a stamped element made of metal or plastic.

The light pass aperture module preferably includes a base, and the base is preferably fixed relative to the cap. The base preferably includes a first axial structure. The blade is preferably movable within a specific range according to the first axial structure so as to vary a size of the light pass aperture. Specifically, the blade is much close to or away from the central axis by changing a relative position between the blade and the first axial structure, thereby controlling the size of the light pass aperture.

The base preferably includes a supporting surface. The supporting surface is preferably further away from the surface level down structure (or the surface sub-level down structure) than the blade, and the blade is preferably disposed on the supporting surface. In the direction parallel to the central axis, when a distance between the surface level down structure and the supporting surface is Dis, and the thickness of the blade is Thi, the following condition is preferably satisfied: $1.001 \leq Dis/Thi \leq 1.995$. Therefore, it is favorable for providing sufficient space between the surface level down structure (or the surface sub-level down structure) and the base for accommodating blades and allowing rotation of the blades.

The surface level down structure (or the surface sub-level down structure) of the cap preferably includes a first counterpart hole, and the first counterpart hole is preferably disposed corresponding to the first axial structure. The blade of the blade assembly preferably includes a first driving hole. The first driving hole is preferably corresponding to the first counterpart hole, and the first axial structure preferably passes through the first driving hole. The first counterpart hole together with the first driving hole is favorable for preventing detachment of the blade from the first axial structure.

The light pass aperture module preferably includes a rotating element, and the rotating element preferably rotates around the central axis. The rotating element preferably includes a second axial structure. The blade is preferably in a linkage movement with the second axial structure so as to vary the size of the light pass aperture. Specifically, the rotating element moves and/or rotates the blades, and works with the first axial structure of the base to vary the size of the light pass aperture.

The surface level down structure (or the surface sub-level down structure) of the cap preferably includes a second counterpart hole, and the second counterpart hole is preferably disposed corresponding to the second axial structure. The blade of the blade assembly preferably includes a second driving hole. The second driving hole is preferably corresponding to the second counterpart hole, and the second axial structure preferably passes through the second driving hole. The second counterpart hole together with the second driving hole is favorable for preventing detachment of the blade from the second axial structure.

The light pass aperture module preferably includes a driving magnet and a driving coil. The driving magnet is preferably disposed on the rotating element, and the driving coil and the driving magnet are preferably disposed corresponding to each other so as to rotate the rotating element. By disposing the driving magnet on the rotating element and providing the driving coil working with the driving magnet, an offset due to a gap is prevented.

The light pass aperture module preferably includes a position sensing circuit. The position sensing circuit is preferably disposed corresponding to the driving magnet so as to sense a position of the rotating element. The position sensing circuit can feedback position information of the rotating element to a controller so as to increase driving speed.

The light pass aperture module preferably includes a ferromagnetic element. The ferromagnetic element is preferably disposed on the base and corresponding to the driving magnet. The ferromagnetic element is preferably further away from the cap than the rotating element so as to maintain a relative position between the rotating element and the cap. The ferromagnetic element attaches the rotating element to the base so as to maintain the relative position between the rotating element and the cap, thereby maintaining a gap formed between the cap and the blades.

The light pass aperture module preferably includes a plurality of rolling elements. The rolling elements are preferably disposed between the base and the rotating element. The rolling elements can guide the rotating element to rotate so as to make the rotating element rotatable. Each of the rolling elements is preferably a sphere, a cylinder, a cone, and the like.

Onto a plane perpendicular to the central axis, a projection of the surface level down structure (or the surface sub-level down structure) is preferably smaller than a projection of single blade. Therefore, it is favorable for reducing contact area so as to prevent abrasion on the surface of the blade.

A surface of the surface level down structure (or the surface sub-level down structure) of the cap preferably faces toward the blade, and an arithmetic average roughness (Ra) of the surface of the surface level down structure is preferably smaller than 0.25 micrometers (μm). Therefore, it is favorable for reducing friction between the surface level down structure (or the surface sub-level down structure) and the blade so as to prolong lifespan of the light pass aperture module. Moreover, the arithmetic average roughness (Ra) of the surface of the surface level down structure (or the surface sub-level down structure) is preferably smaller than 0.2 μm. Moreover, the arithmetic average roughness (Ra) of the surface of the surface level down structure (or the surface sub-level down structure) is preferably smaller than 0.17 μm.

The surface level down structure (or the surface sub-level down structure) of the cap preferably faces a surface of the blade, and an arithmetic average roughness (Ra) of the surface of the blade or a smooth area thereon is preferably smaller than 0.25 μm. Therefore, it is favorable for reducing friction between the surface level down structure (or the surface sub-level down structure) and the blade so as to prolong lifespan of the light pass aperture module. Moreover, the arithmetic average roughness (Ra) of the surface of the blade or the smooth area thereon is preferably smaller than 0.2 μm. Moreover, the arithmetic average roughness (Ra) of the surface of the blade or the smooth area thereon is preferably smaller than 0.17 μm.

The present disclosure provides a camera module that preferably includes a lens assembly and the aforementioned light pass aperture module. The lens assembly is preferably disposed corresponding to the light pass aperture of the light pass aperture module in the central axis. The light pass aperture is preferably an aperture stop of the camera module.

The present disclosure provides an electronic device that preferably includes the abovementioned camera module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
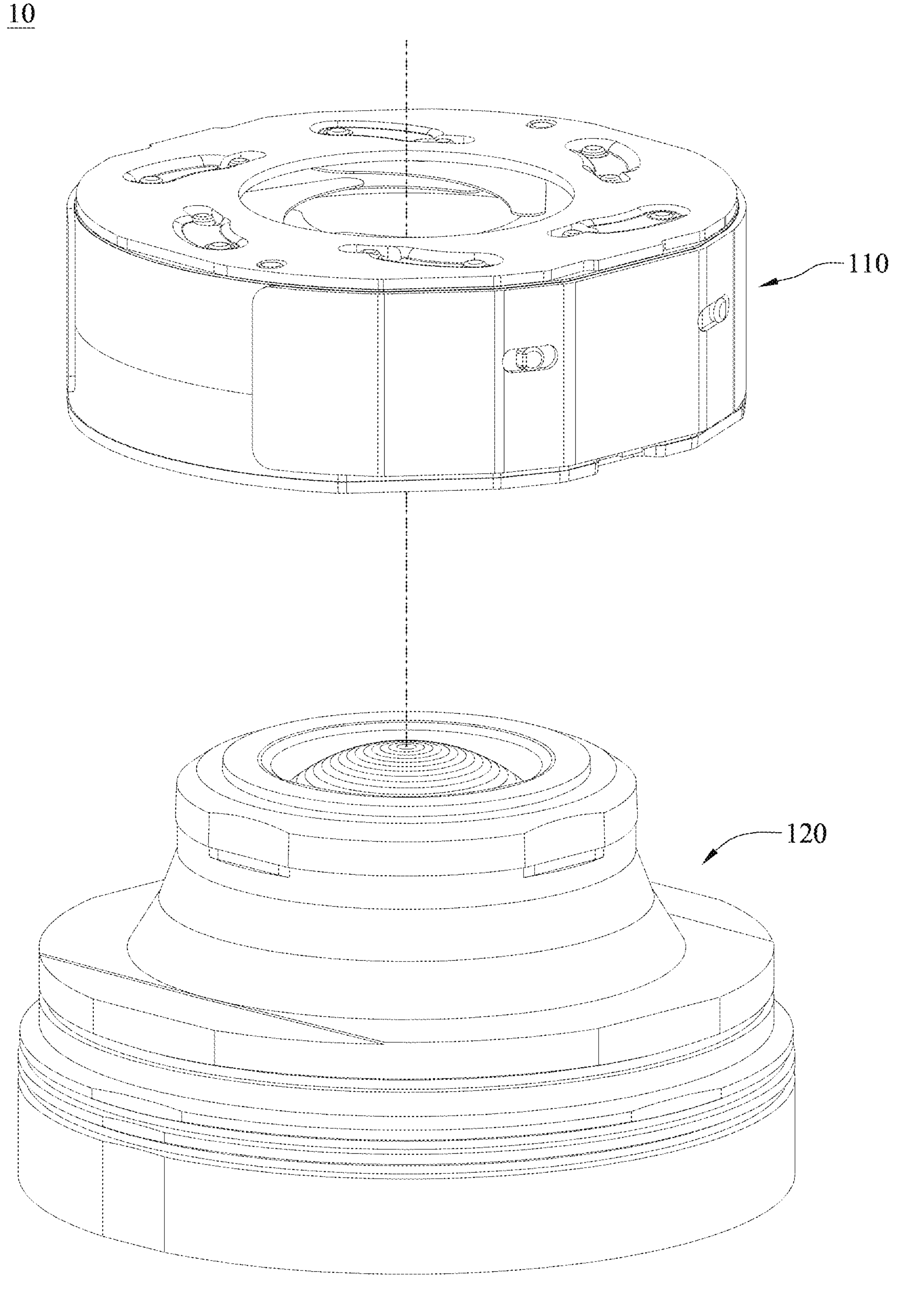
FIG. 2 is an exploded view of the camera module in FIG. 1.
Figure 3:
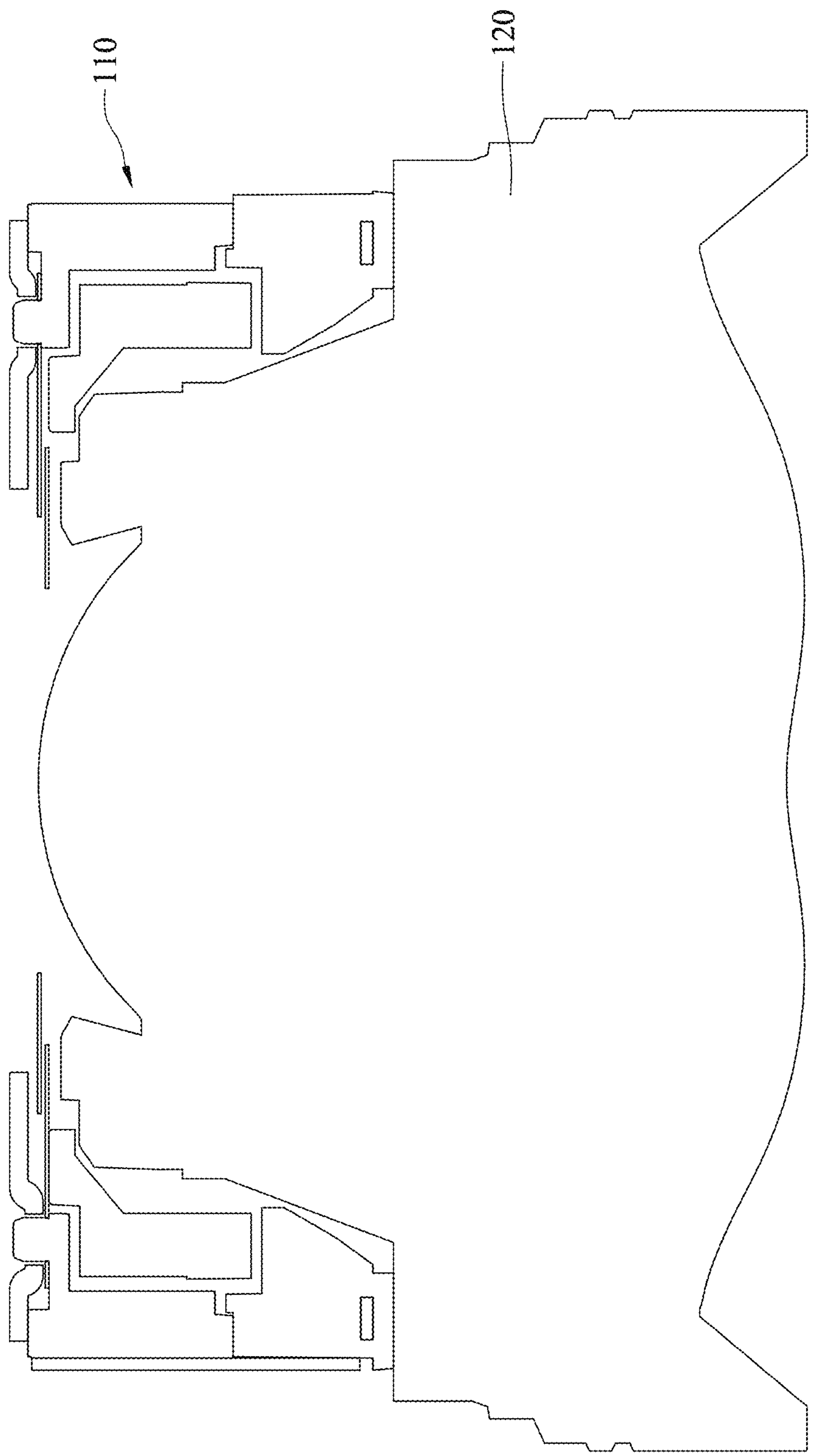
FIG. 3 is a cross-sectional view of a light pass aperture module and a lens assembly of the camera module in FIG. 1.
Figure 4:
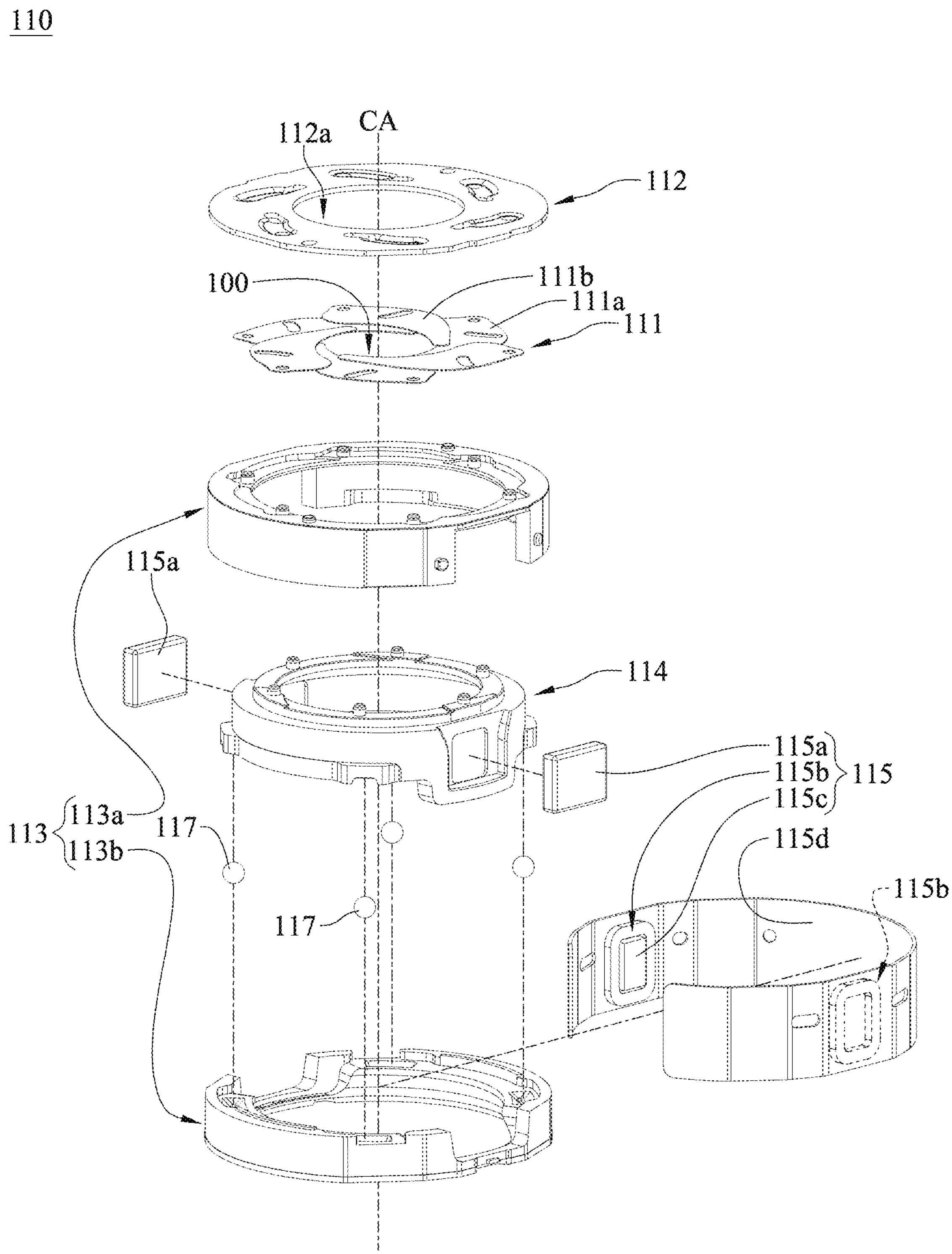
FIG. 4 is an exploded view of the light pass aperture module of the camera module in FIG. 1.
Figure 5:
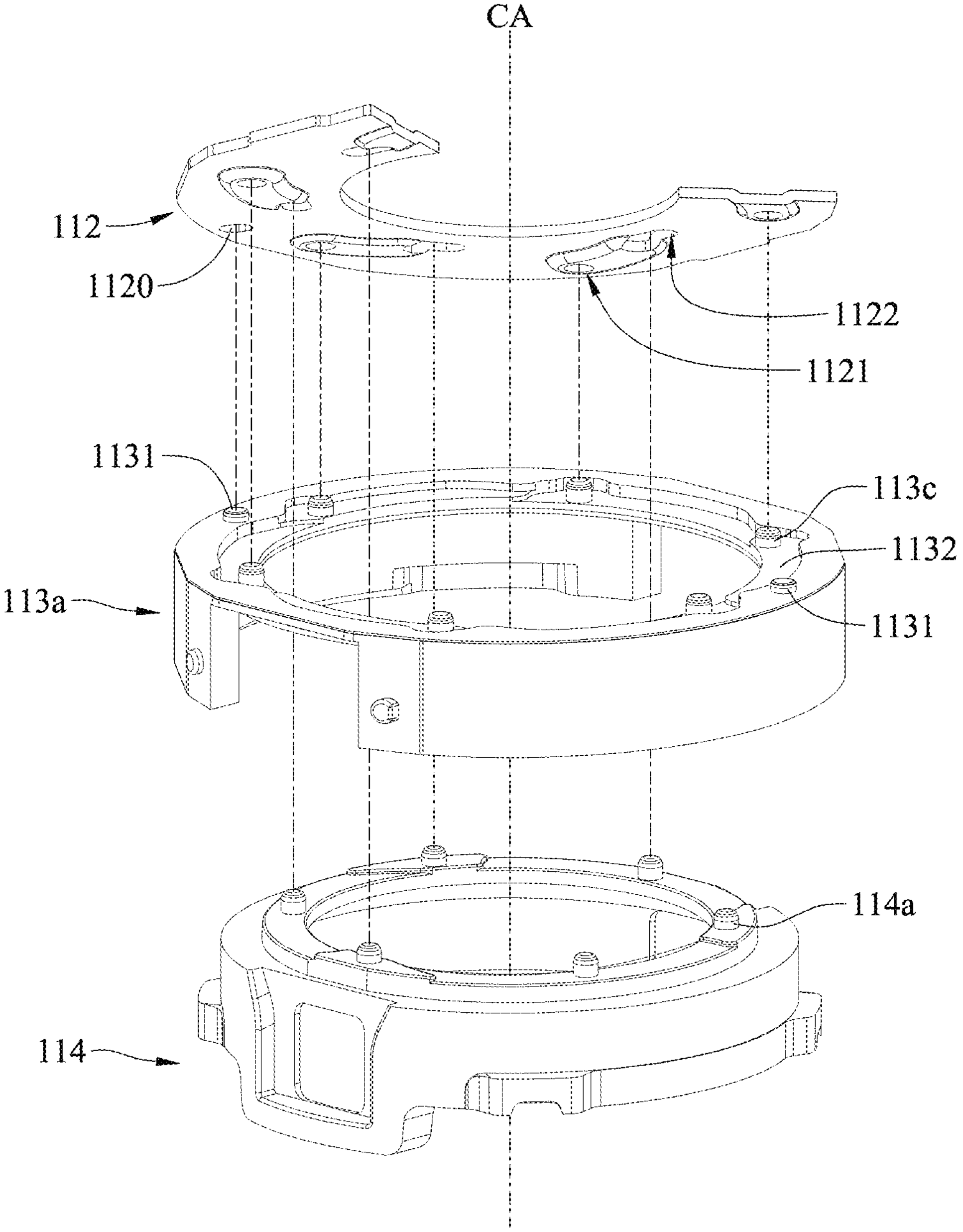
FIG. 5 is an exploded view of a cap, a base and a rotating element of the camera module in FIG. 4.
Figure 6:
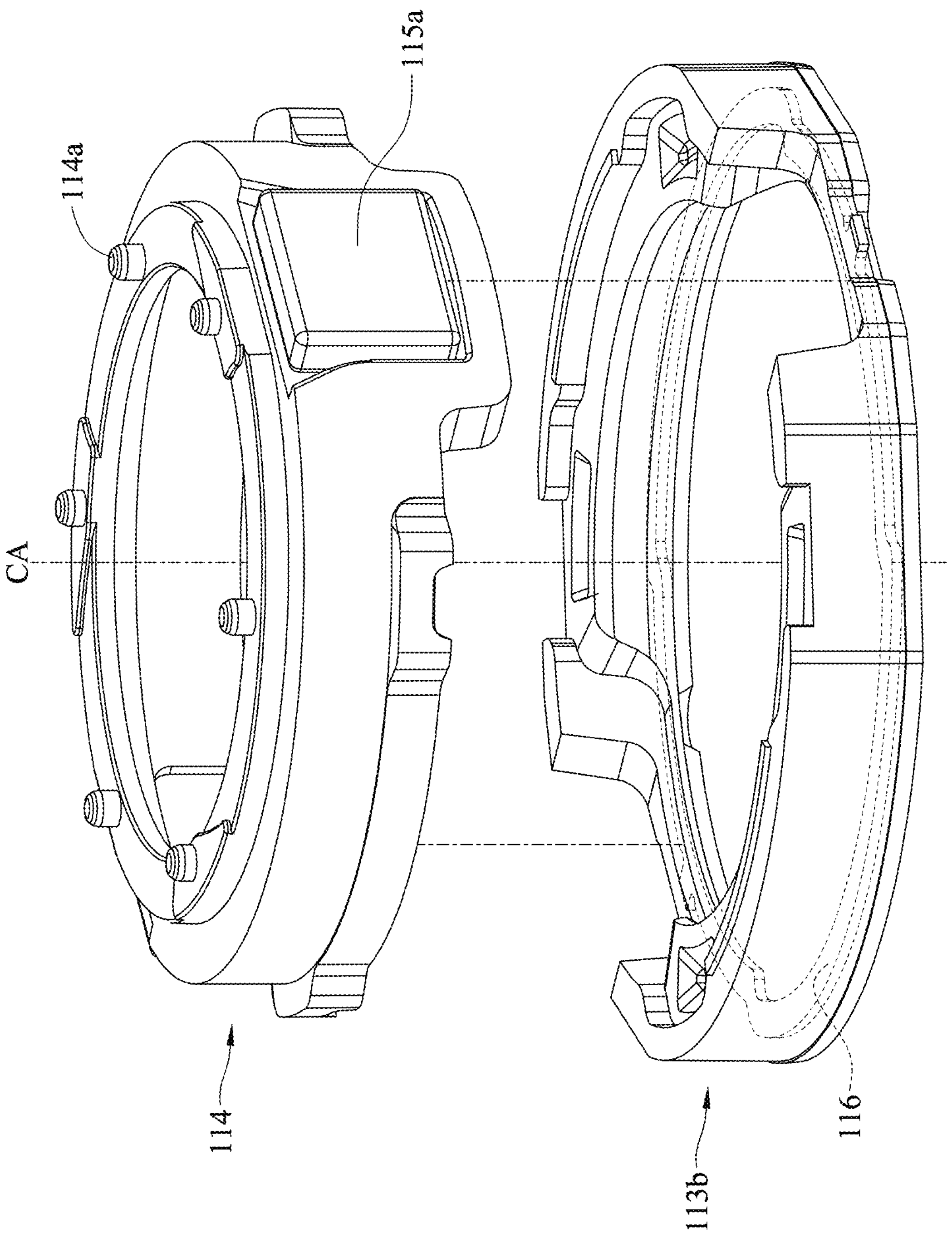
FIG. 6 is an exploded view of the base, the rotating element and driving magnets of the camera module in FIG. 4.

Please refer to FIG. 1 through FIG. 6. FIG. 1 is a perspective view of a camera module according to the 1st embodiment of the present disclosure, FIG. 2 is an exploded view of the camera module in FIG. 1, FIG. 3 is a cross-sectional view of a light pass aperture module and a lens assembly of the camera module in FIG. 1, FIG. 4 is an exploded view of the light pass aperture module of the camera module in FIG. 1, FIG. 5 is an exploded view of a cap, a base and a rotating element of the camera module in FIG. 4, and FIG. 6 is an exploded view of the base, the rotating element and a driving magnet of the camera module in FIG. 4;

In this embodiment, a camera module 1 includes an imaging lens 10 and a lens carrier 20. The lens carrier 20 carries the imaging lens 10, such that the imaging lens 10 is applicable to an electronic device (not shown in this embodiment). The lens carrier 20 can further provide functions of focusing, anti-shaking, and the like, but the present disclosure is not limited thereto. The imaging lens 10 includes a light pass aperture module 110 and a lens assembly 120, and the light pass aperture module 110, in order along a central axis CA, includes a blade assembly 111 and a cap 112.

The blade assembly 111 includes a plurality of blades **111*a*, 111*b*. The blades 111*a*, 111*b* together surround to define a light pass aperture 100 of the light pass aperture module 110, and the light pass aperture 100 is variable in size with the central axis CA as a center. The cap 112 is located above and covers the blade assembly 111. The cap 112 has a through hole 112*a*, and the through hole 112*a* is disposed corresponding to the light pass aperture 100. The lens assembly 120 includes one or more lens elements provided to change optical path, and each of the lens elements is located at specific position on an optical axis. The lens assembly 120 may further include a barrel for accommodating the lens elements. The lens assembly 120 is disposed corresponding to the light pass aperture 100 of the light pass aperture module 110 on the central axis CA; more specifically, the optical axis of the lens assembly 120 substantially overlaps the central axis CA of the light pass aperture module 110. The light pass aperture 100 of the light pass aperture module 110 can be referred as an aperture stop of the camera module 1, and an image sensor may be disposed on an image surface of the lens assembly 120** for image capturing.

The light pass aperture module 110 further includes a base 113, a rotating element 114, a driving assembly 115, a ferromagnetic element 116, and a plurality of rolling elements 117.

The base 113 is fixed relative to the cap 112. Specifically, the base 113 includes a first part **113*a* and a second part 113*b* assembled with each other. The first part 113*a* includes a plurality of positioning structures 1131 located on a top surface thereof, and the cap 112 has a plurality of counterpart holes 1120 corresponding to respective positioning structures 1131. The positioning structures 1131 work with the counterpart holes 1120 so as to fix the cap 112 to the first part 113*a*. The first part 113*a* of the base 113 has a supporting surface 1132, and the blades 111*a*, 111*b* are disposed on the supporting surface 1132. The base 113 further includes a plurality of first axial structures 113***c* formed on the first part 113*a*.

The rotating element 114 is disposed between the first part 113*a* and the second part 113*b* of the base 113, and the rotating element 114 is rotatable around the central axis CA. The rotating element 114 further includes a plurality of second axial structures 114*a*.

The driving assembly 115 includes a plurality of driving magnets 115*a*, a plurality of driving coils 115*b* and an electronic unit 115*c*. The driving magnets 115*a* are disposed on the rotating element 114, and the driving coils 115*b* are disposed corresponding to respective driving magnets 115*a* so as to rotate the rotating element 114.

The ferromagnetic element 116 is disposed on the second part 113*b* of the base 113, and the ferromagnetic element 116 is disposed corresponding to the driving magnets 115*a*. The ferromagnetic element 116 is further away from the cap 112 than the rotating element 114 so as to maintain a relative position between the rotating element 114 and the cap 112.

The rolling elements 117 are disposed between the second part 113*b* of the base 113 and the rotating element 114, such that the rotating element 114 is rotatable. Specifically, the rolling elements 117 can guide the rotating element 114 to rotate around the central axis CA. Each of the rolling elements 117 may be a sphere, a cylinder, a cone, and the like, but the present disclosure is not limited thereto.

Figure 7:
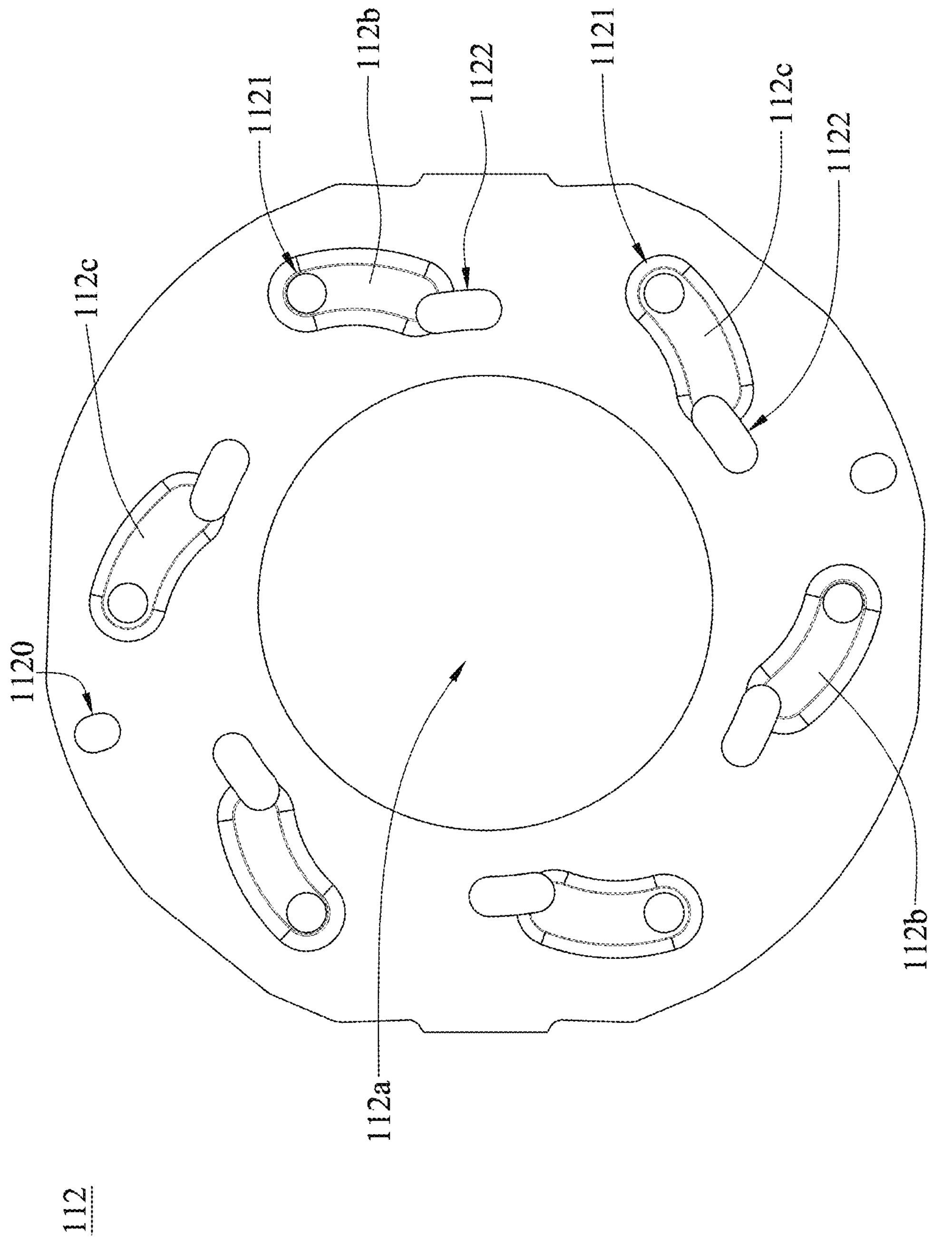
FIG. 7 is a top view of the cap of the camera module in FIG. 4.
Figure 8:
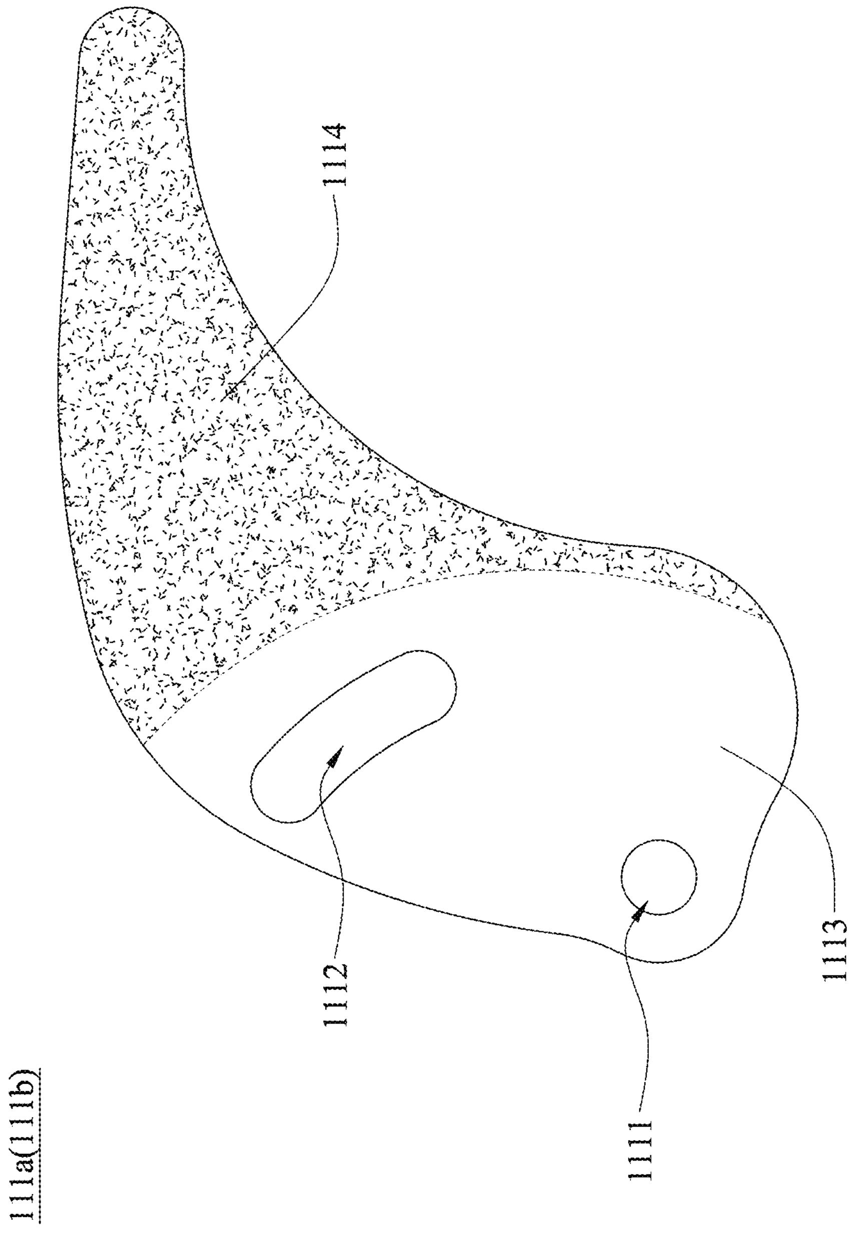
FIG. 8 is a top view of a movable blade of the camera module in FIG. 4.
Figure 9:
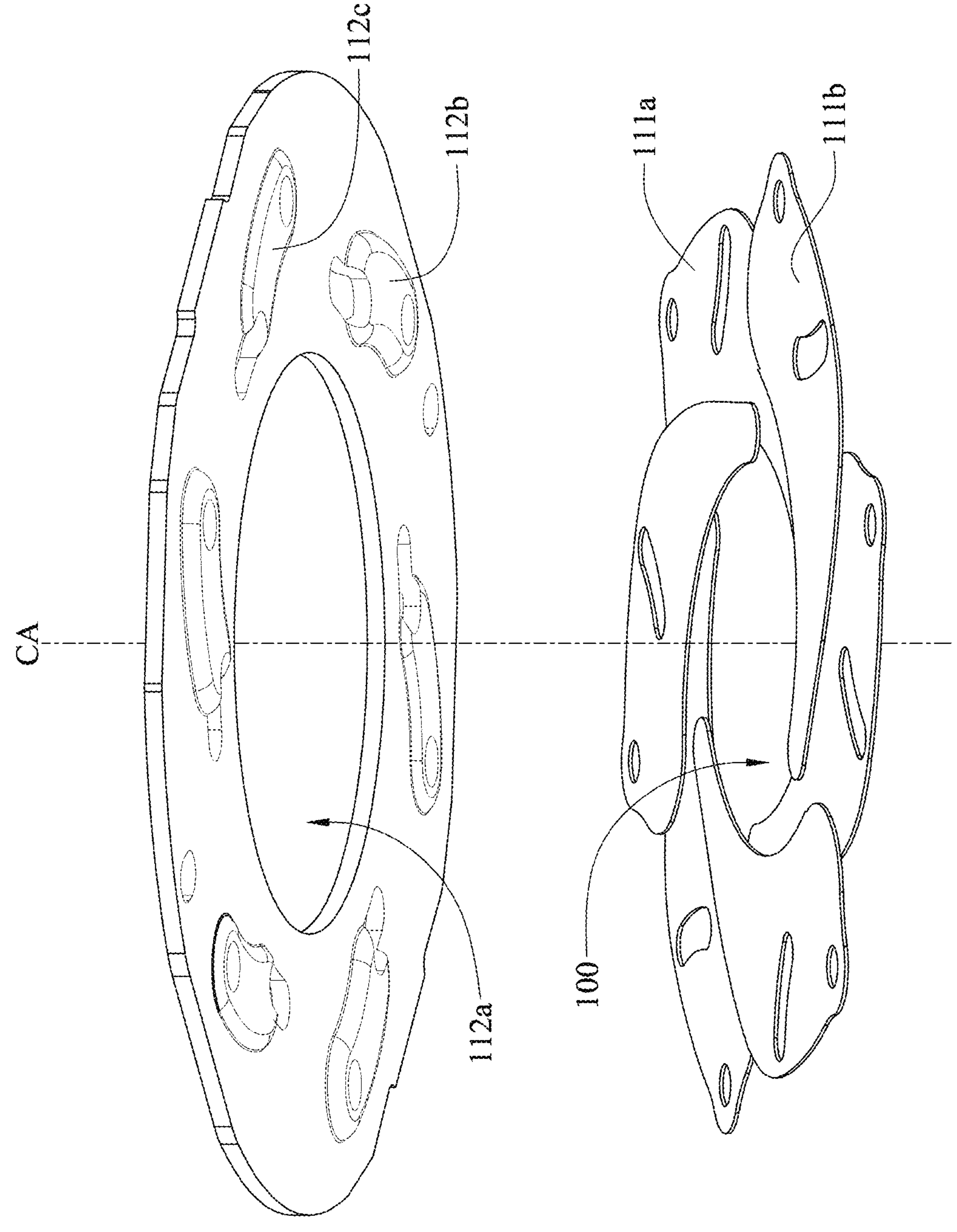
FIG. 9 is an exploded view of the cap and a blade assembly of the camera module in FIG. 4.

Please further refer to FIG. 7 through FIG. 9. FIG. 7 is a top view of the cap of the camera module in FIG. 4, FIG. 8 is a top view of a movable blade of the camera module in FIG. 4, and FIG. 9 is an exploded view of the cap and a blade assembly of the camera module in FIG. 4.

Figure 10:
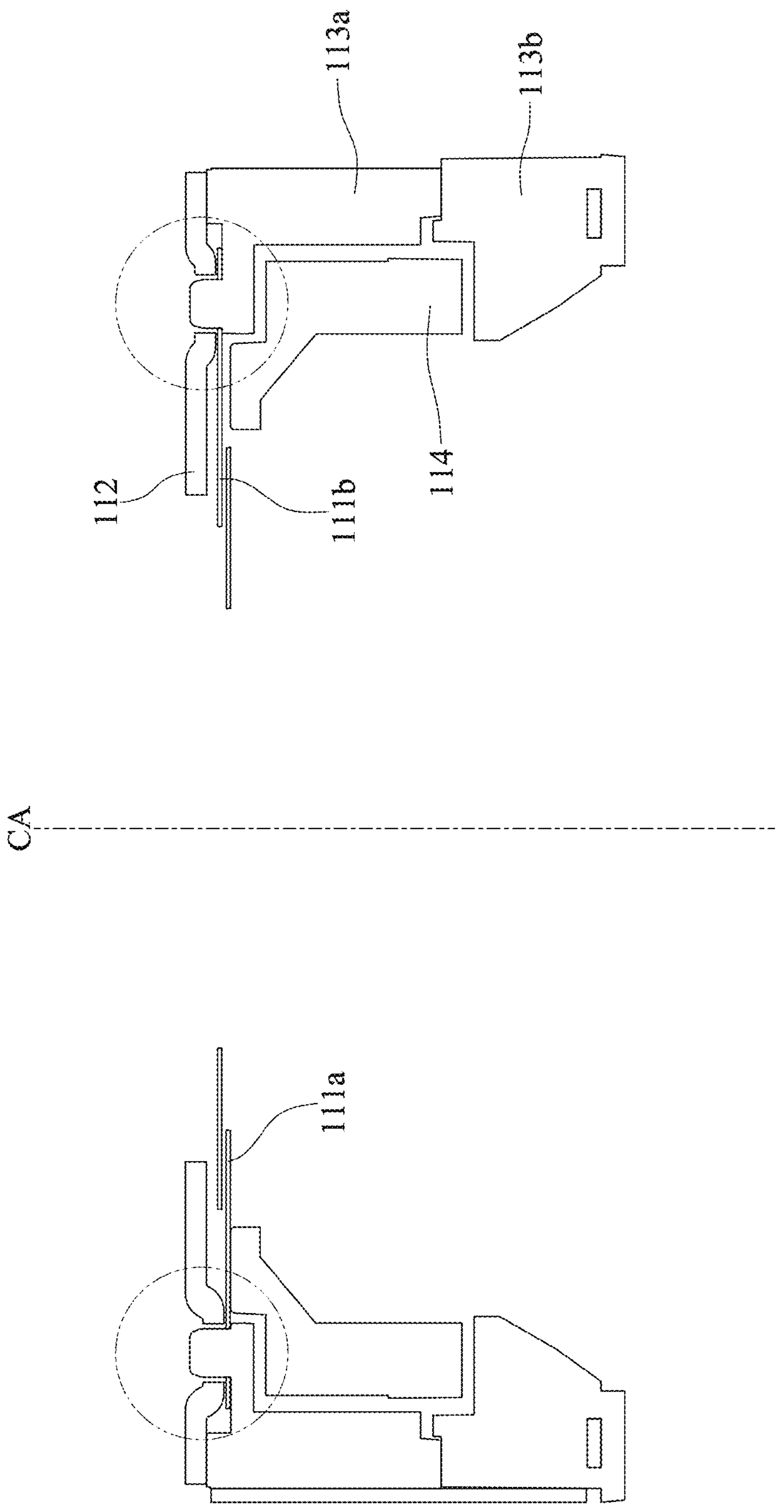
FIG. 10 is a side view of the assembled cap, blade assembly, base and rotating element of the camera module in FIG. 4.
Figure 11:
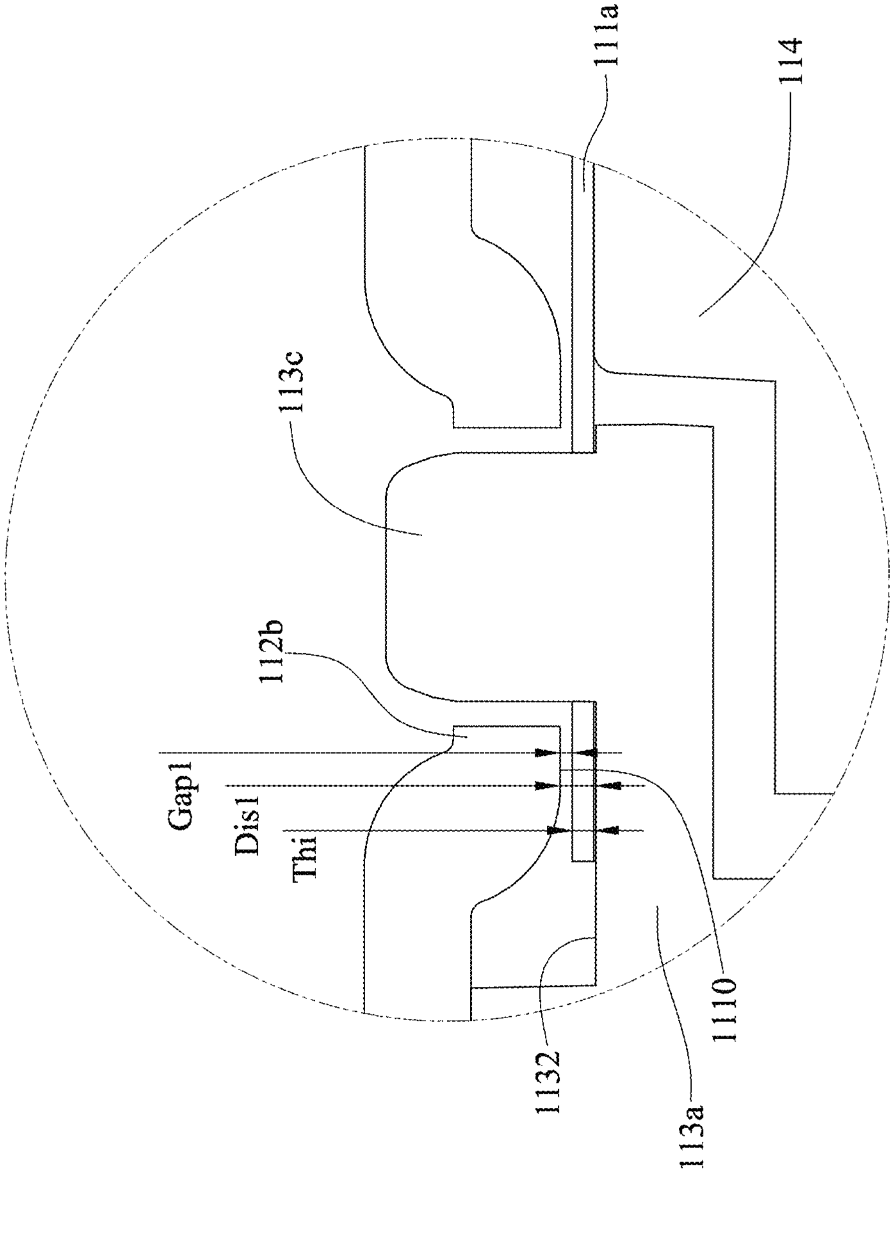
FIG. 11 is a partial and enlarged view of the cap and the blade assembly in FIG. 10.
Figure 12:
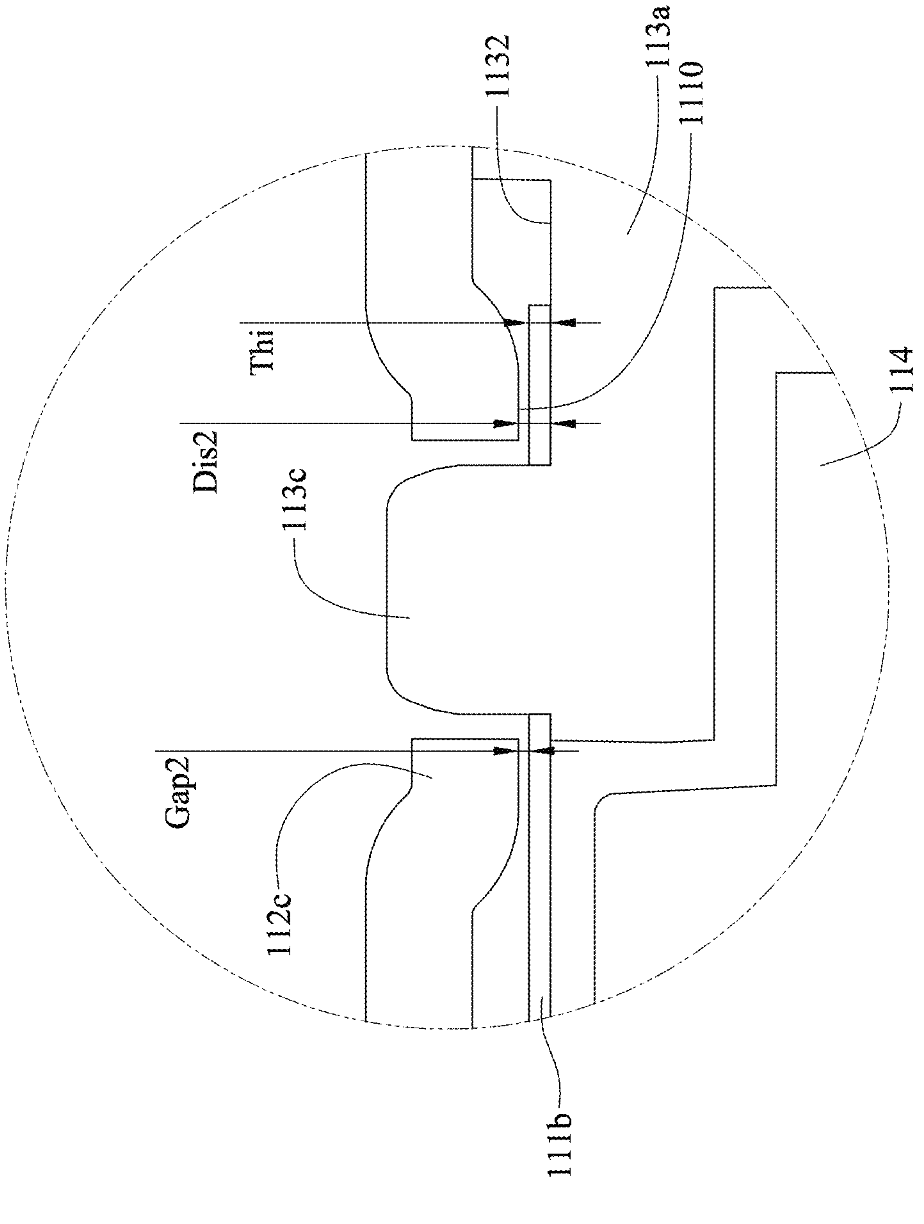
FIG. 12 is another partial and enlarged view of the cap and the blade assembly in FIG. 10.

The cap 112 includes a plurality of surface level down structures 112*b* and a plurality of surface sub-level down structures 112*c*. Please further refer to FIG. 10 to FIG. 12. FIG. 10 is a side view of the assembled cap, blade assembly, base and rotating element of the camera module in FIG. 4, FIG. 11 is a partial and enlarged view of the cap and the blade assembly in FIG. 10, and FIG. 12 is another partial and enlarged view of the cap and the blade assembly in FIG. 10.

One of the surface level down structures 112*b* of the cap 112 is disposed corresponding to one or more blades 111*a*, and the surface level down structure 112*b* is closer to the one or more blades 111*a* than the through hole 112*a*. Moreover, one of the surface sub-level down structure 112*c* of the cap 112 is disposed corresponding to one or more blades 111*b*, and the surface sub-level down structure 112*c* is closer to the one or more blades 111*b* than the through hole 112*a*. In detail, the cap 112 may be a stamped element made of metal or plastic, and each surface level down structure 112*b* and each surface sub-level down structure 112*c* may be a bump formed on the cap 112 by embossing of stamping process and protruded toward the blade 111*a* or 111*b*. A length of the bump along the central axis CA can be defined as a depth of the surface level down structure 112*b* or that of the surface sub-level down structure 112*c*. Onto a virtual reference plane (not shown in the drawings) perpendicular to the central axis CA, a projection of the surface level down structure 112*b* is smaller than a projection of single blade 111*a*, and a projection of the surface sub-level down structure 112*c* is smaller than a projection of single blade 111*b*.

This embodiment exemplarily describes the cap 112 including the surface level down structure 112*b* and the surface sub-level down structure 112*c* which have difference depths, but the present disclosure is not limited thereto. In some embodiments, the cap may include surface level down structures having identical depth.

The supporting surface 1132 of the first part 113*a* of the base 113 is further away from the surface level down structure 112*b* than the blade 111*a*, such that the blade 111*a* is located between the supporting surface 1132 and the surface level down structure 112*b*. Likewise, the supporting surface 1132 is further away from the surface sub-level down structure 112*c* than the blade 111*b*, such that the blade 111*b* is located between the supporting surface 1132 and the surface sub-level down structure 112*c*.

In a direction parallel to the central axis CA, the surface sub-level down structure 112*c* is closer to the through hole 112*a* of the cap 112 than the surface level down structure 112*b*; that is, in the direction parallel to the central axis CA, a gap between the blade 111*a* and corresponding surface level down structure 112*b* is smaller than a gap between the blade 111*b* and corresponding surface sub-level down structure 112*c*.

Each surface level down structure 112*b* (or surface sub-level down structure 112*c*) includes a first counterpart hole 1121, and the first counterpart hole 1121 is disposed corresponding to one of the first axial structures 113*c* of the base 113. Each surface level down structure 112*b* (or surface sub-level down structure 112*c*) also includes a second counterpart hole 1122, and the second counterpart hole 1122 is disposed corresponding to one of the second axial structures 114*a* of the rotating element 114.

Moreover, each of the blades 111*a*, 111*b* includes a first driving hole 1111. The first driving hole 1111 is disposed corresponding to the first counterpart hole 1121, and the first axial structure 113*c* passes through respective first driving hole 1111. The blades 111*a*, 111*b* is movable within a specific range according to the first axial structures 113*c* so as to vary a size of the light pass aperture 100 of the light pass aperture module 110. Further, each of the blades 111*a*, 111*b* includes a second driving hole 1112. The second driving hole 1112 is disposed corresponding to the second counterpart hole 1122, and the second axial structure 114*a* passes through respective second driving hole 1112. The blades 111*a*, 111*b* are in a linkage movement with the second axial structures 114*a* so as to vary a size of the light pass aperture 100.

A surface 1110 of the surface level down structure 112*b* facing toward the blade 111*a* has an arithmetic average roughness (Ra) smaller than 0.25 μm, and a surface 1110 of the surface sub-level down structure 112*c* facing toward the blade 111*b* has an arithmetic average roughness (Ra) smaller than 0.25 μm.

A surface of the blade 111*a* which the surface level down structure 112*b* faces (that is, a top surface of the blade 111*a*) has an arithmetic average roughness (Ra) smaller than 0.25 μm, and a surface of the blade 111*b* which the surface sub-level down structure 112*c* faces (that is, a top surface of the blade 111*b*) has an arithmetic average roughness (Ra) smaller than 0.25 μm. More specifically, referring to FIG. 8, each of the blades 111*a*, 111*b* has a smooth surface 1113 and a rough surface 1114, and the smooth surface 1113 is referred as said surface (top surface) of respective blades 111*a*, 111*b* which faces toward the surface level down structure 112*b* or the surface sub-level down structure 112*c*, and the smooth surface 1113 has an arithmetic average roughness (Ra) smaller than 0.25 μm.

In the direction parallel to the central axis CA, when the gap between the surface level down structure 112*b* and respective blade 111*a* is Gap1, and a thickness of the blade 111*a* is Thi, the following conditions are satisfied: Gap1=0.018 millimeters (mm); Thi=0.03 mm; and Gap1/Thi=0.6.

In the direction parallel to the central axis CA, when the gap between the surface sub-level down structure 112*c* and respective blade 111*b* is Gap2, and a thickness of the blade 111*b* is Thi, the following conditions are satisfied: Gap2=0.015 mm; Thi=0.03 mm; and Gap2/Thi=0.5.

In the direction parallel to the central axis CA, when a distance between the surface level down structure 112*b* and the supporting surface 1132 is Dis1, and the thickness of the blade 111*a* is Thi, the following conditions are satisfied: Dis1=0.05 mm; and Dis1/Thi=1.67.

In the direction parallel to the central axis CA, when a distance between the surface sub-level down structure 112*c* and the supporting surface 1132 is Dis2, and the thickness of the blade 111*a* is Thi, the following conditions are satisfied: Dis2=0.046 mm; and Dis2/Thi=1.53.

Referring to FIG. 4 and FIG. 6, the electronic unit 115*c* includes a driver controller and a position sensing circuit. The driver controller is electrically connected to the driving coils 115*b* via an electronic component 115*d* so as to control the driving coils 115*b* to generate a required magnetic field. The position sensing circuit is disposed corresponding to one of the driving magnet 115*a* to sense the rotating element 114. The position sensing circuit is electrically connected to the driver controller to achieve feedback control, thereby ensuring proper size adjustment of the controllable aperture stop of the light pass aperture module 110.

Figure 25:
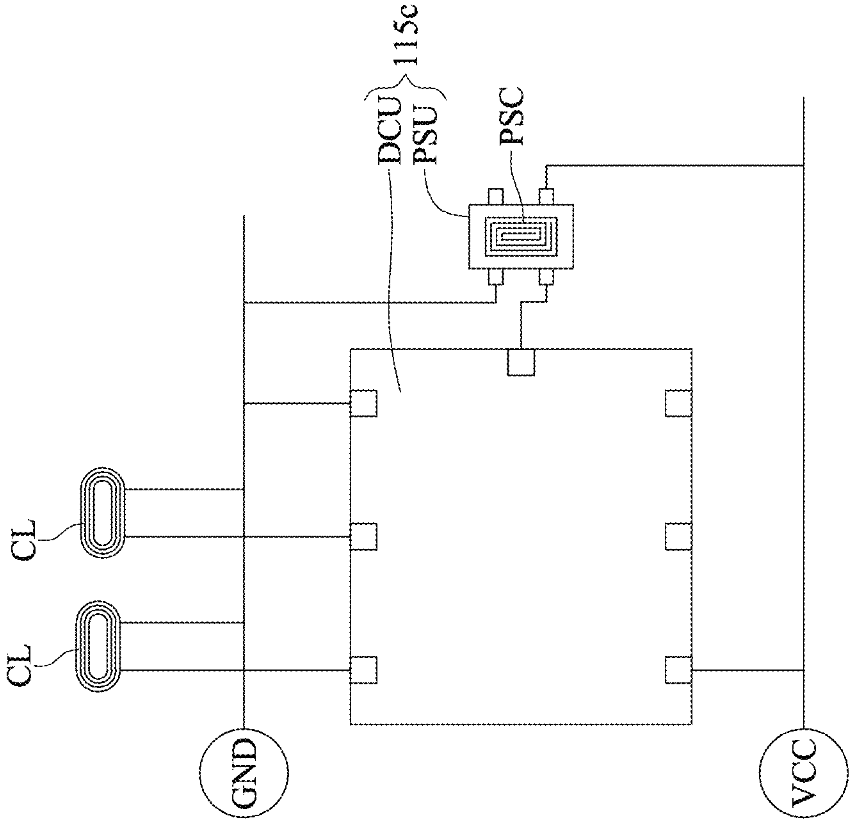
FIG. 25 is a schematic view of an electrical connection of a driver controller, a position sensor and driving coils according to one embodiment of the present disclosure.
Figure 26:
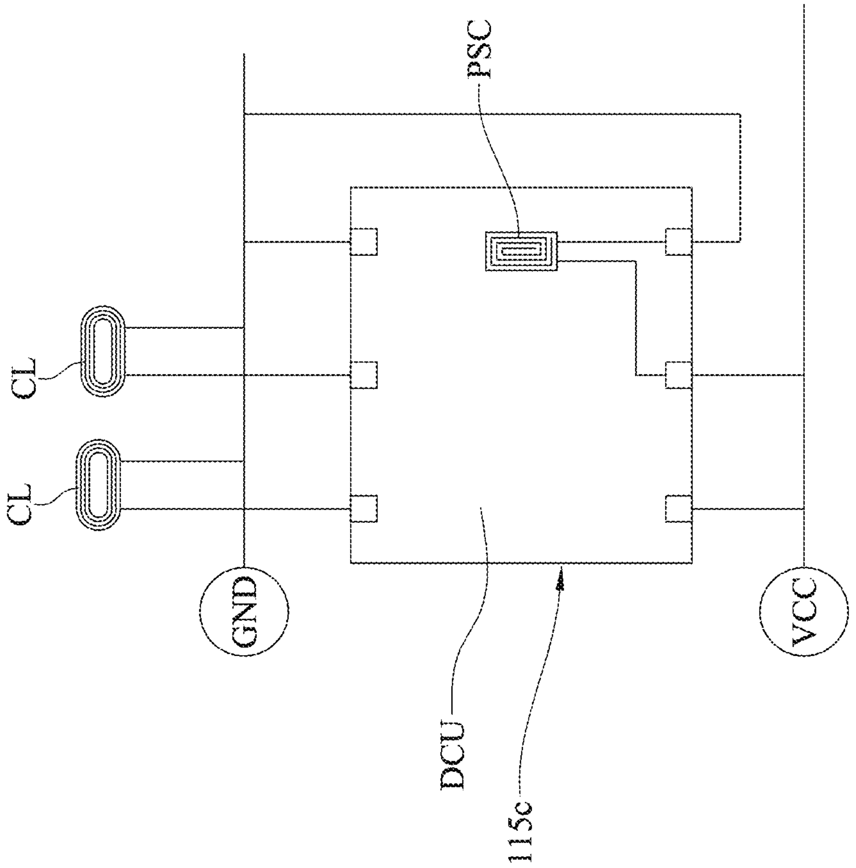
FIG. 26 is a schematic view of an electrical connection of a driver controller and driving coils according to one embodiment of the present disclosure.
Figure 27:
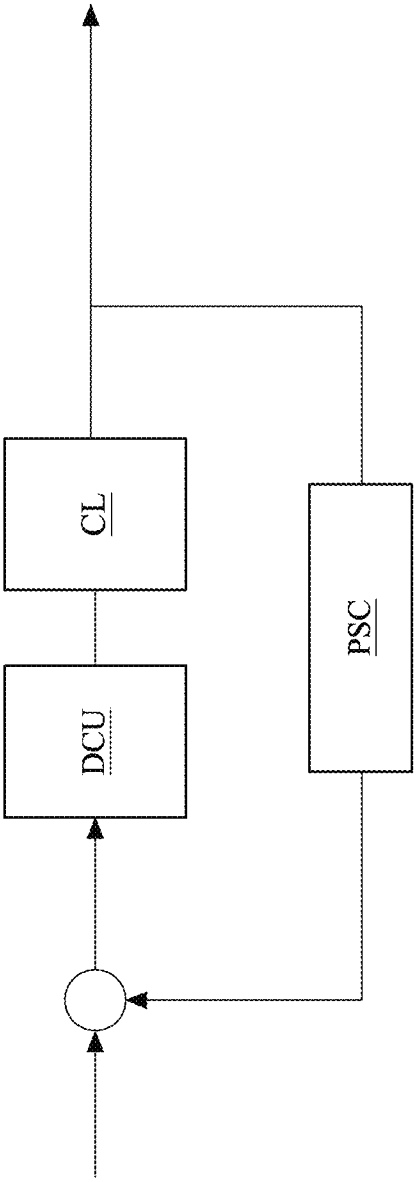
FIG. 27 is a block diagram of a feedback control system of the driver controller, the driving coils and a position sensing circuit in FIG. 25 or FIG. 26.

The electrical connection and feedback control process of the electronic unit 115*c* and the driving coils 115*b* in this embodiment are illustrated in reference to FIG. 25 through FIG. 27. FIG. 25 is a schematic view of an electrical connection of a driver controller, a position sensor and driving coils according to one embodiment of the present disclosure. In FIG. 25, the electronic unit 115*c* includes a driver controller DCU and a position sensor PSU which are two separate components and connected to a power VCC and ground GND. The driver controller DCU is electrically connected to driving coils CL so as to control the driving coils CL to generate required magnetic fields. One end of each of the driving coils CL is connected to ground GND. The position sensor PSU has a position sensing circuit PSC configured to obtain the position information of a rotating element and driving magnets in a direction around a light pass aperture, and the position sensor PSU is electrically connected to the driver controller DCU so as to generate signals and transfer signals to the driver controller DCU according to the obtained position information. FIG. 26 is a schematic view of an electrical connection of a driver controller and driving coils according to one embodiment of the present disclosure. In FIG. 26, the electronic unit 115*c* is a position sensing circuit PSC within a driver controller DCU, and the driver controller DCU and the position sensing circuit PSC are connected to a power VCC and ground GND. The driver controller DCU is electrically connected to driving coils CL so as to control the driving coils CL to generate required magnetic field. One end of each of the driving coils CL is connected to ground GND. The position sensing circuit PSC of the driver controller DCU is configured to obtain the position information of a rotating element and driving magnets in a direction around a light pass aperture. FIG. 27 is a block diagram of a feedback control system of the driver controller, the coils and a position sensing circuit in FIG. 25 or FIG. 26. As shown in FIG. 27, in a closed loop feedback control system, the position sensing circuit PSC detects the position of the driving magnets on the rotating element and feedbacks the same to the driver controller DCU, and therefore, the driver controller DCU may adjust the magnetic field generated by the driving coils CL so as to adjust the position of the rotating element.

Figure 13:
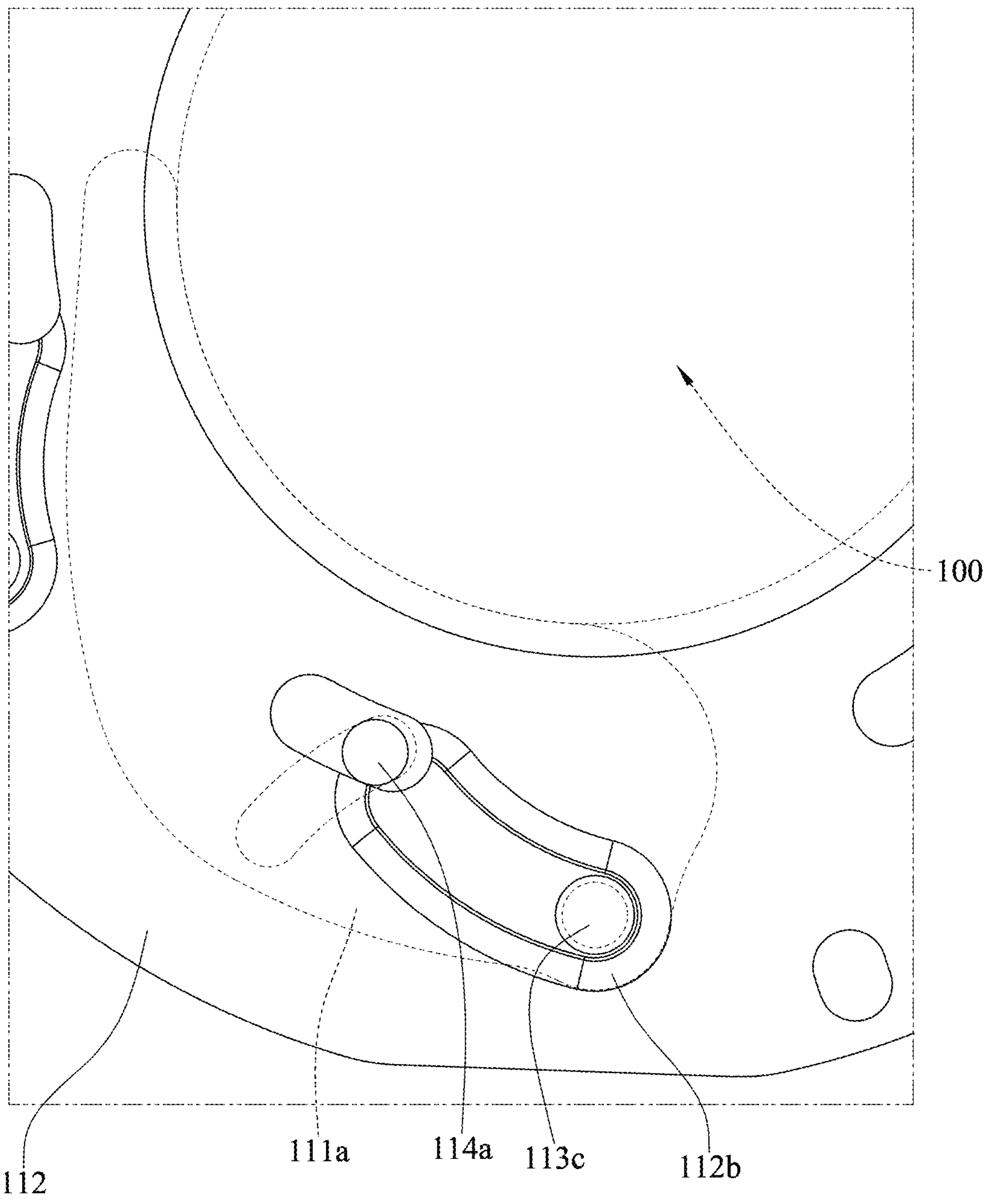
FIG. 13 is a partial and top view of the light pass aperture module of the camera module in a large aperture state according to the 1st embodiment of the present disclosure.
Figure 14:
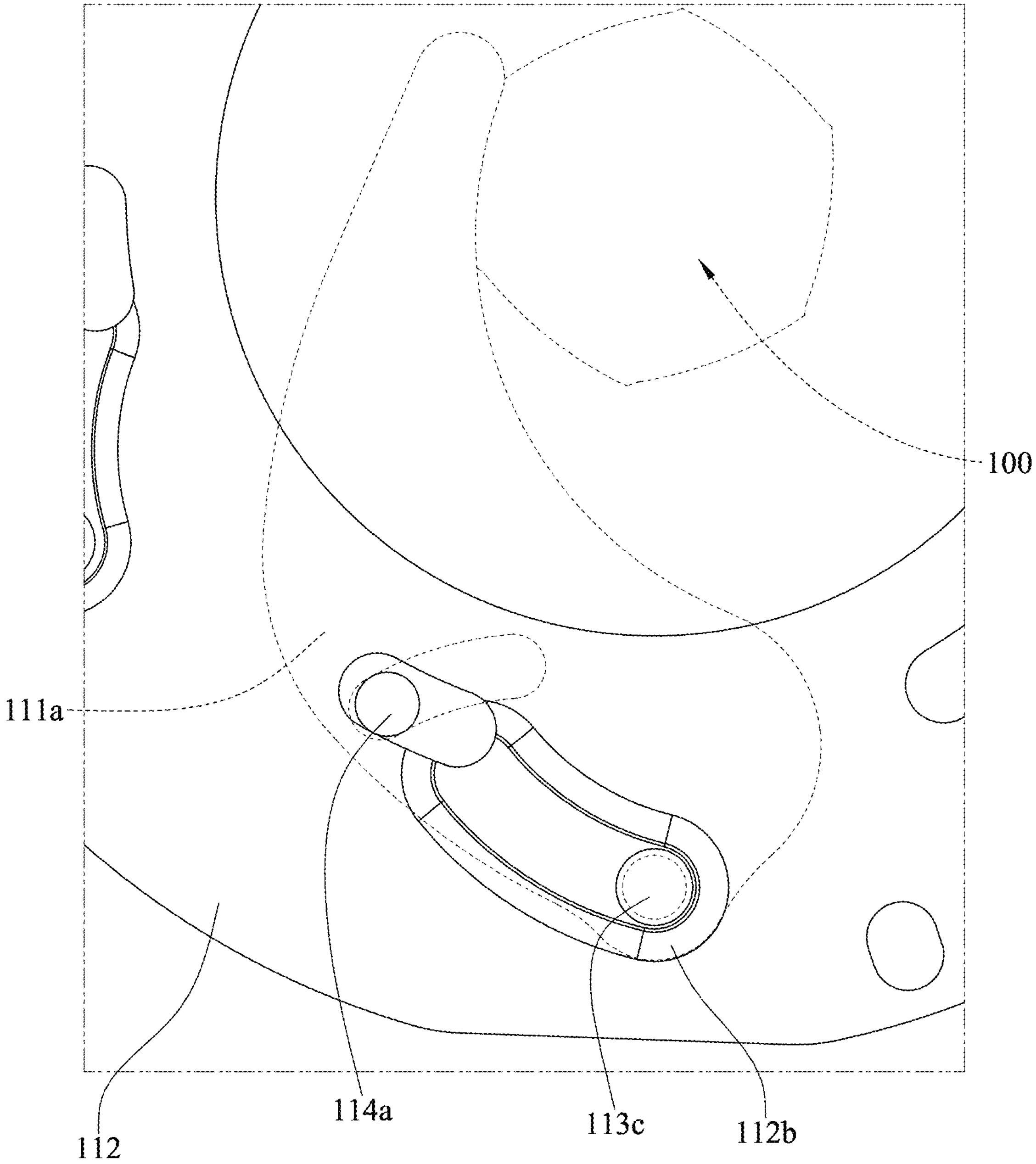
FIG. 14 is a partial and top view of the light pass aperture module of the camera module in a small aperture state according to the 1st embodiment of the present disclosure.

The size of the light pass aperture 100 can be adjusted by the aforementioned configuration, and its detail can be referred to FIG. 13 and FIG. 14. FIG. 13 is a partially top view of the light pass aperture module in a large aperture state according to the 1st embodiment of the present disclosure, and FIG. 14 is a partially top view of the light pass aperture module in a small aperture state according to the 1st embodiment of the present disclosure. In this embodiment, the size of the light pass aperture 100 can be adjusted by the driving assembly 115, such that the light pass aperture module 110 can have various aperture states, and thus, the camera module 1 can have different f-numbers.

For example, as shown in FIG. 4 and FIG. 13, when the light pass aperture 100 is to be enlarged, the driving magnets 115*a* and the driving coils 115*b* of the driving assembly 115 together drive the rotating element 114 to rotate, and the second axial structures 114*a* of the rotating element 114 drive the blades 111*a*, 111*b* to rotate around respective first axial structures 113*c* as rotation axis, thereby increasing the size of the light pass aperture 100. On the other hand, as shown in FIG. 4 and FIG. 14, when the light pass aperture 100 is to be narrowed, the driving magnets 115*a* and the driving coils 115*b* of the driving assembly 115 together drive the rotating element 114 to rotate reversely, and the second axial structures 114*a* of the rotating element 114 drive the blades 111*a*, 111*b* to rotate reversely around respective first axial structures 113*c* as rotation axis, thereby reducing the size of the light pass aperture 100.

2nd Embodiment

Figure 15:
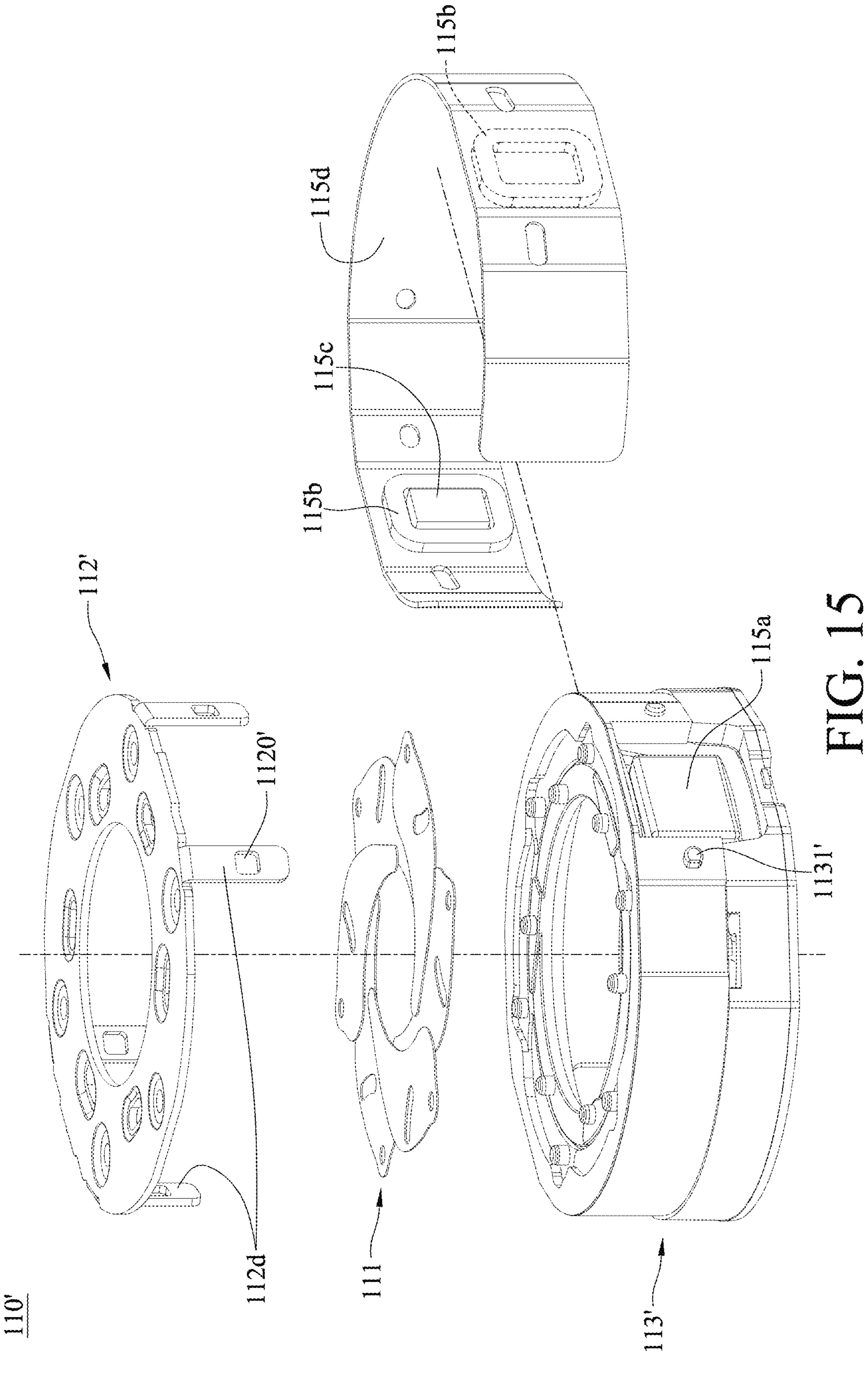
FIG. 15 is an exploded view of a light pass aperture module according to the 2nd embodiment of the present disclosure.
Figure 16:
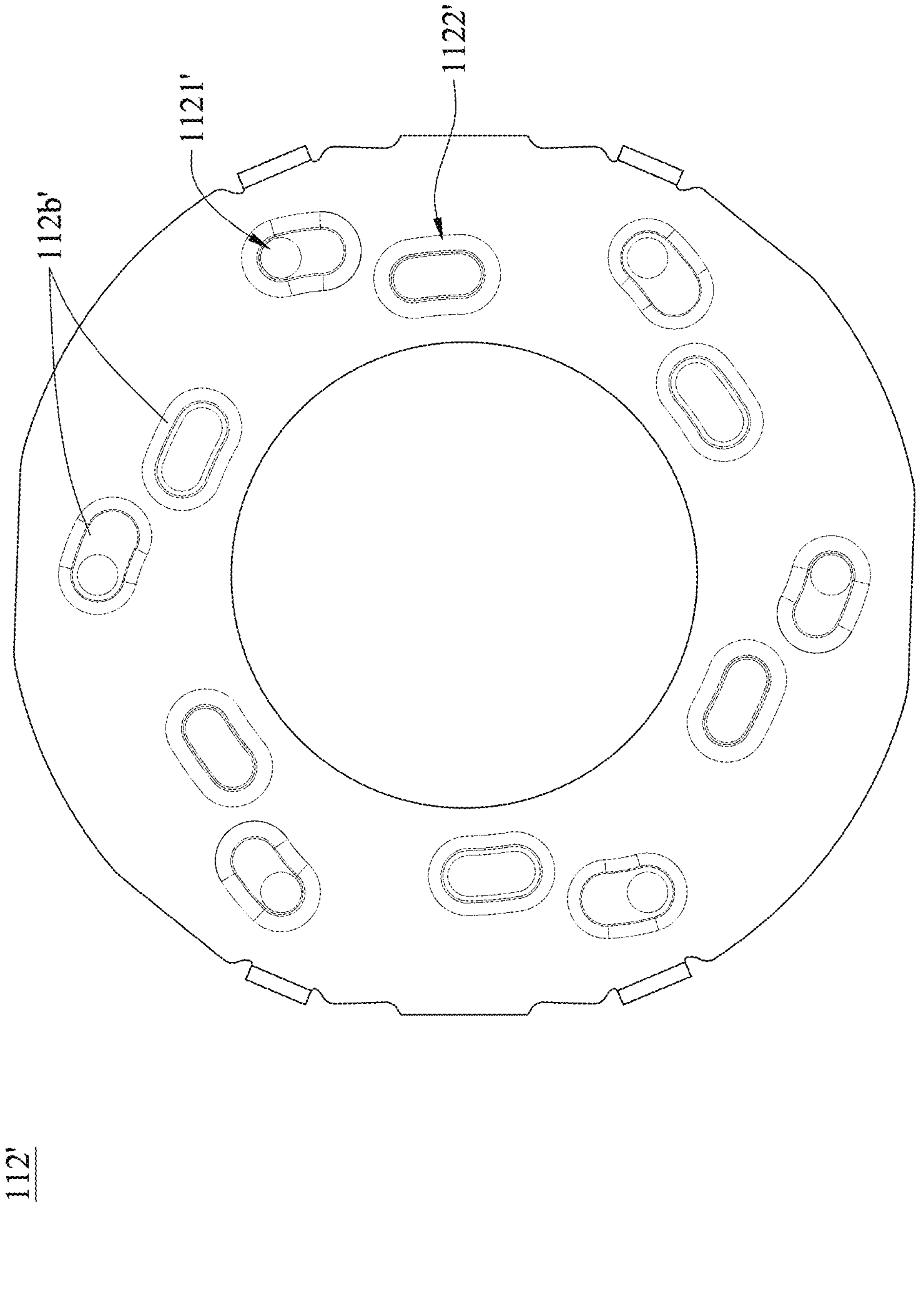
FIG. 16 is a top view of a cap of the light pass aperture module in FIG. 15.
Figure 17:
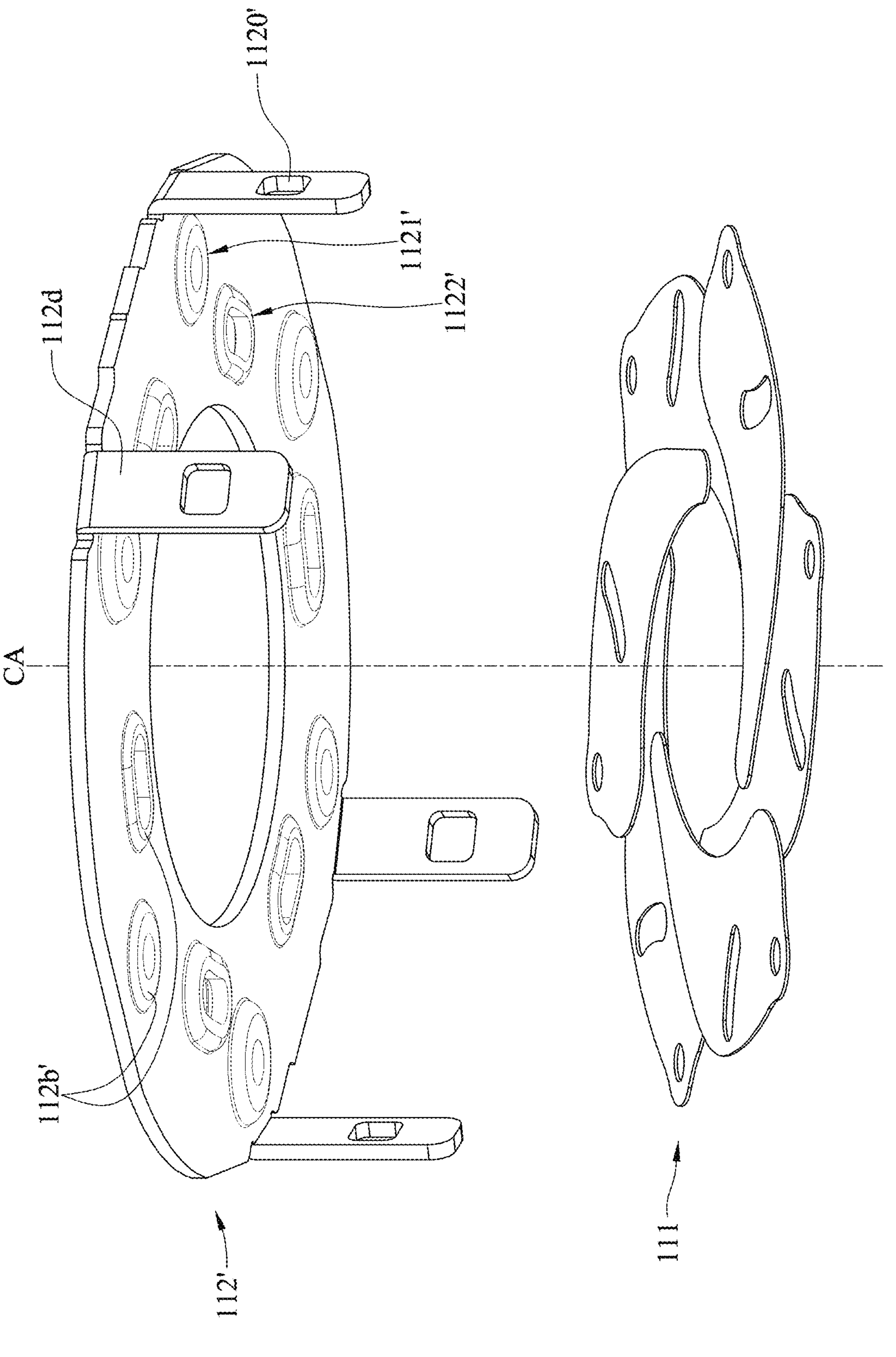
FIG. 17 is an exploded view of the cap and a blade assembly of the light pass aperture module in FIG. 15.

Please refer to FIG. 15 through FIG. 17. FIG. 15 is an exploded view of a light pass aperture module according to the 2nd embodiment of the present disclosure, FIG. 16 is a top view of a cap of the light pass aperture module in FIG. 15, and FIG. 17 is an exploded view of the cap and a blade assembly of the light pass aperture module in FIG. 15. A difference between the light pass aperture module 110' in this embodiment and the light pass aperture module 110 in the 1st embodiment is mainly in the surface level down structure of the cap and the positioning structure of the base, and the following describes details of the difference.

A cap 112' of a light pass aperture module 110' includes a plurality of legs 112*d* extending downward, and each leg 112*d* has a counterpart hole 1120'. The base 113' includes a plurality of positioning structures 1131' on the surface thereof. The positioning structures 1131' work with the counterpart holes 1120' to fix the cap 112' to the base 113'. The positioning structure 1131' fits into respective counterpart hole 1120' by engagement, thereby enhancing the fixity of the cap 112' to the base 113'.

Moreover, the cap 112' further includes a plurality of surface level down structures 112*b*', and each surface level down structure 112*b*' has a first counterpart hole 1121' and a second counterpart hole 1122'. Unlike the 1st embodiment in which the surface level down structure 112*b* (or the surface sub-level down structure 112*c*) has the first counterpart hole 1121 and the second counterpart hole 1122 spatially connected to each other, the first counterpart hole 1121' and the second counterpart hole 1122' of the surface level down structure 112*b*' in this embodiment are two separate through holes.

3rd Embodiment

Figure 18:
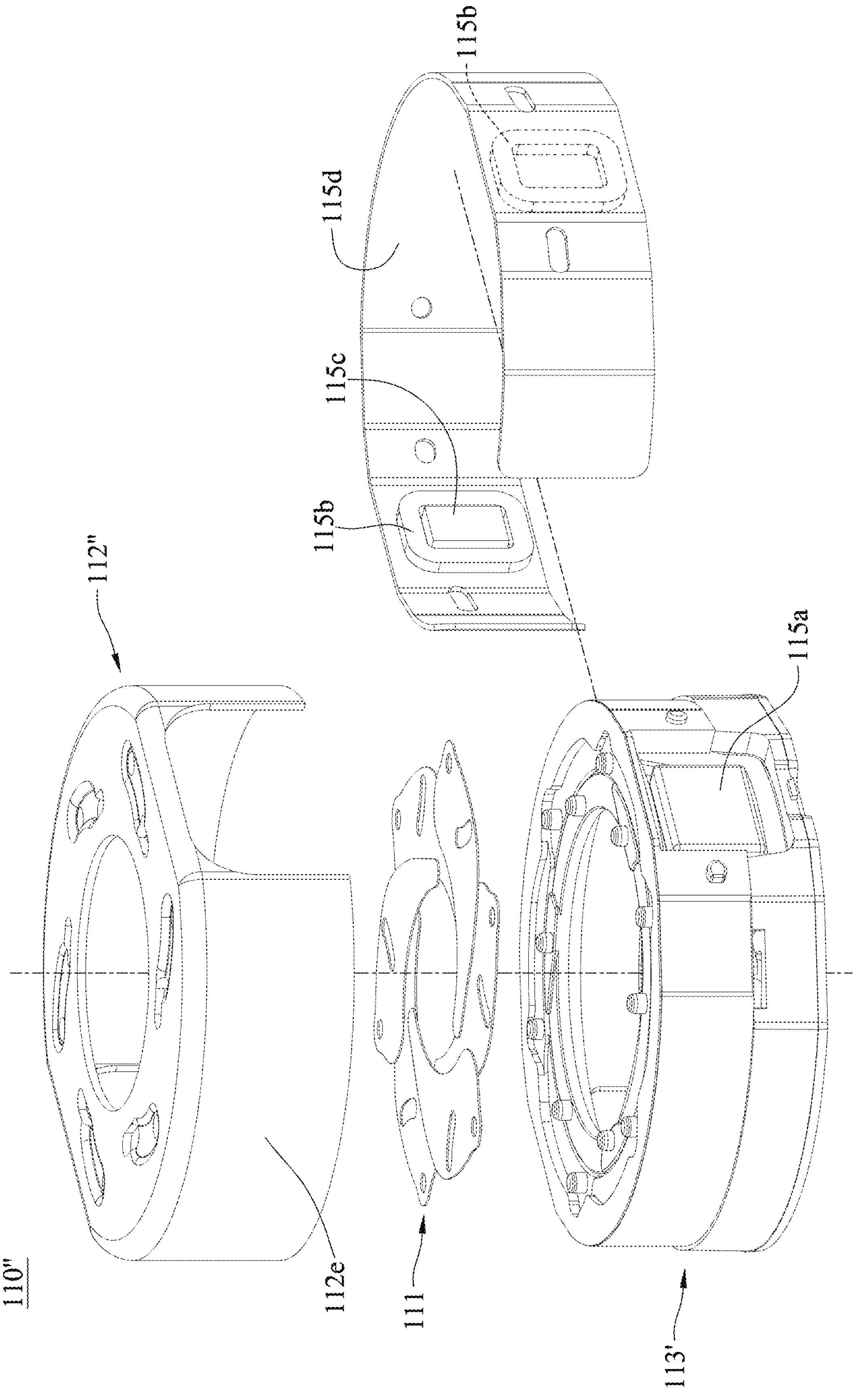
FIG. 18 is an exploded view of a light pass aperture module according to the 3rd embodiment of the present disclosure.
Figure 19:
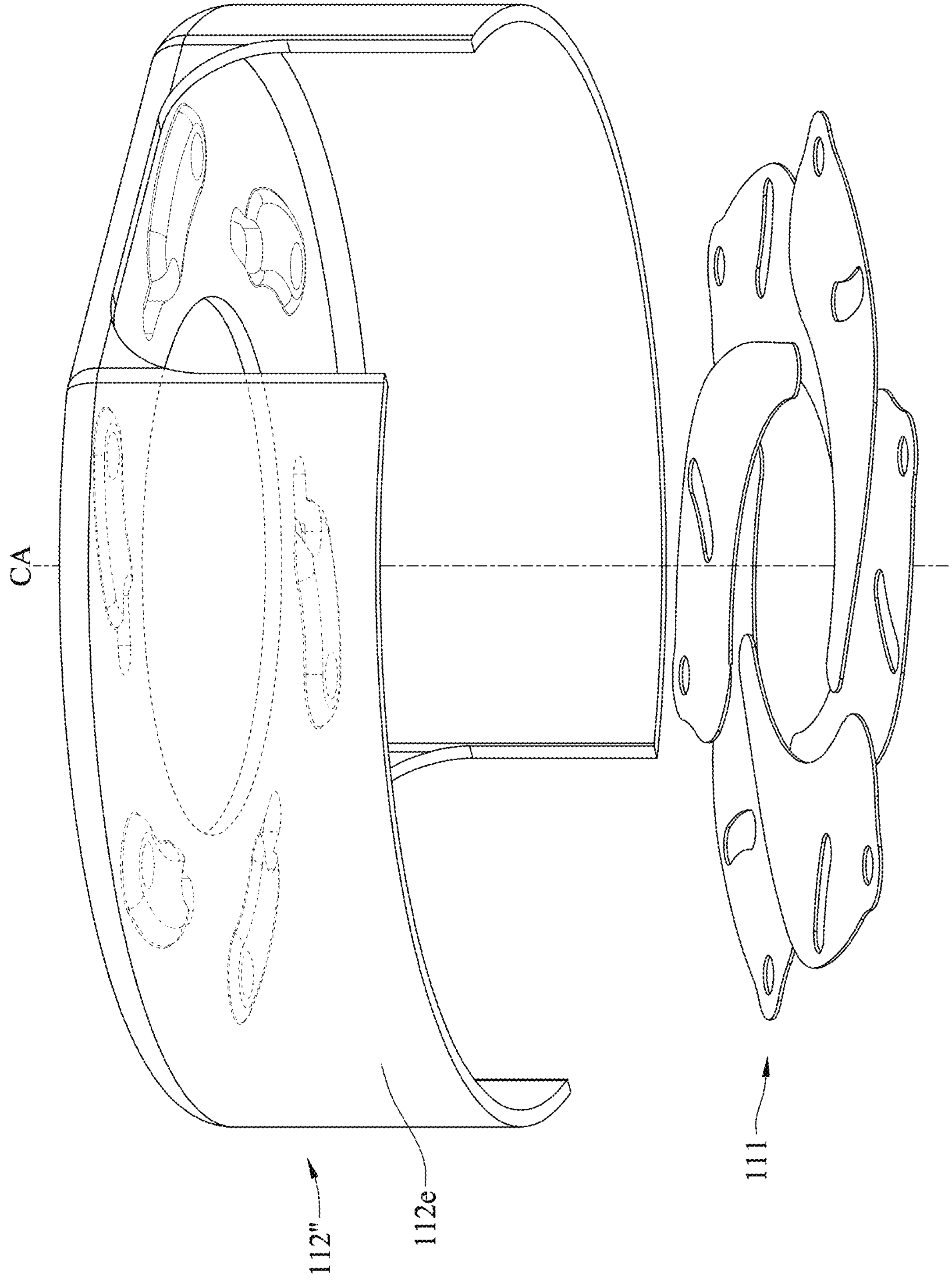
FIG. 19 is an exploded view of a cap and a blade assembly of the light pass aperture module in FIG. 18.

Please refer to FIG. 18 and FIG. 19. FIG. 18 is an exploded view of a light pass aperture module according to the 3rd embodiment of the present disclosure, and FIG. 19 is an exploded view of a cap and a blade assembly of the light pass aperture module in FIG. 18. A difference between the light pass aperture module 110" in this embodiment and the light pass aperture module 110 in the 1st embodiment is mainly in the fixing of the cap to the base, and the following describes details of the difference.

A cap 112" of a light pass aperture module 110" further includes a lateral portion 112*e*. Unlike the 1st embodiment in which the cap 112 is fixed to the base 113 by engagement of the positioning structure 1131 into respective counterpart hole 1120, the base 113 is sleeved by the cap 112" in this embodiment, and the cap 112" is fixed to the base 113 by geometric shape mating or glue.

4th Embodiment

Figure 20:
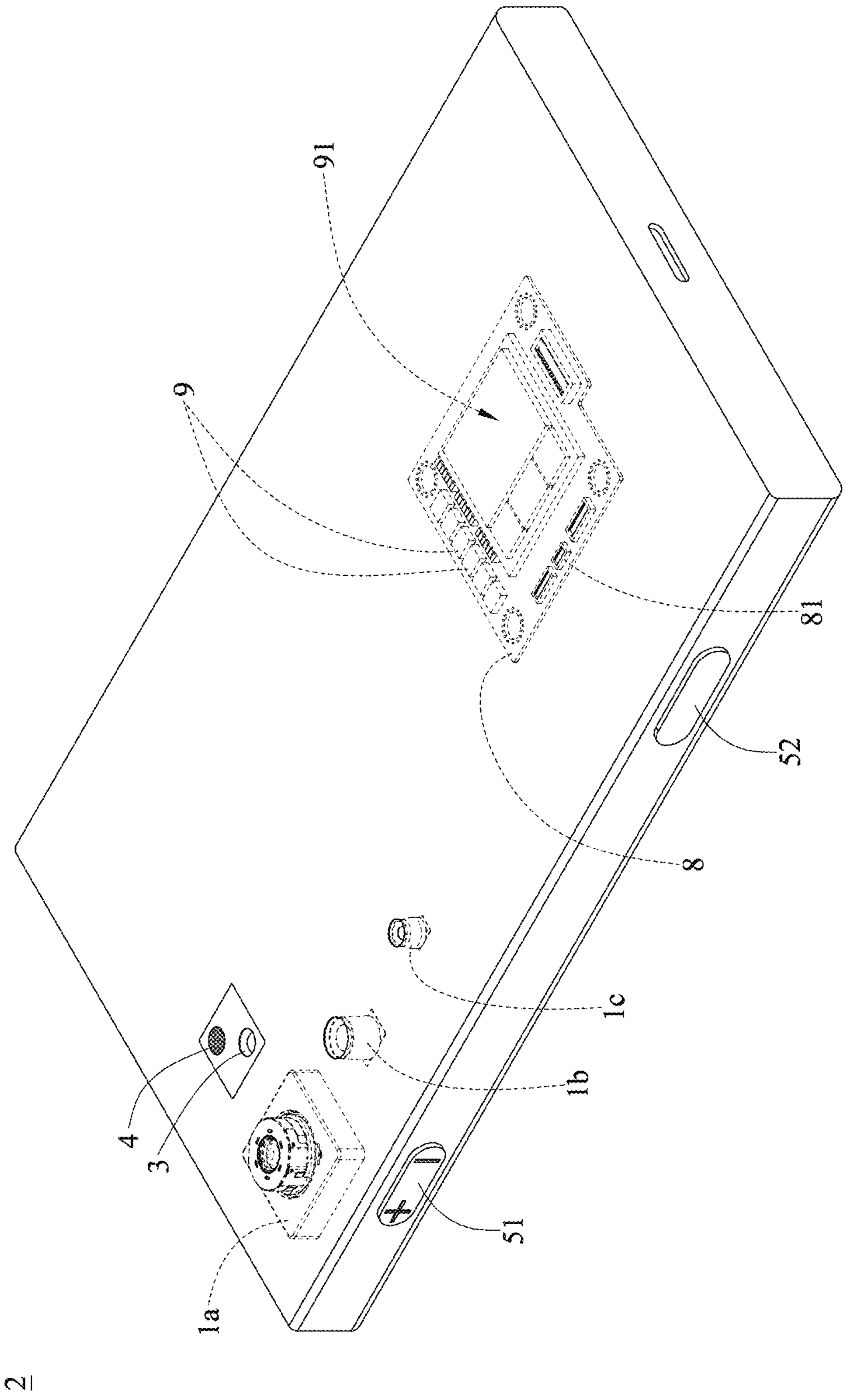
FIG. 20 is a perspective view of an electronic device according to the 4th embodiment of the present disclosure.
Figure 21:
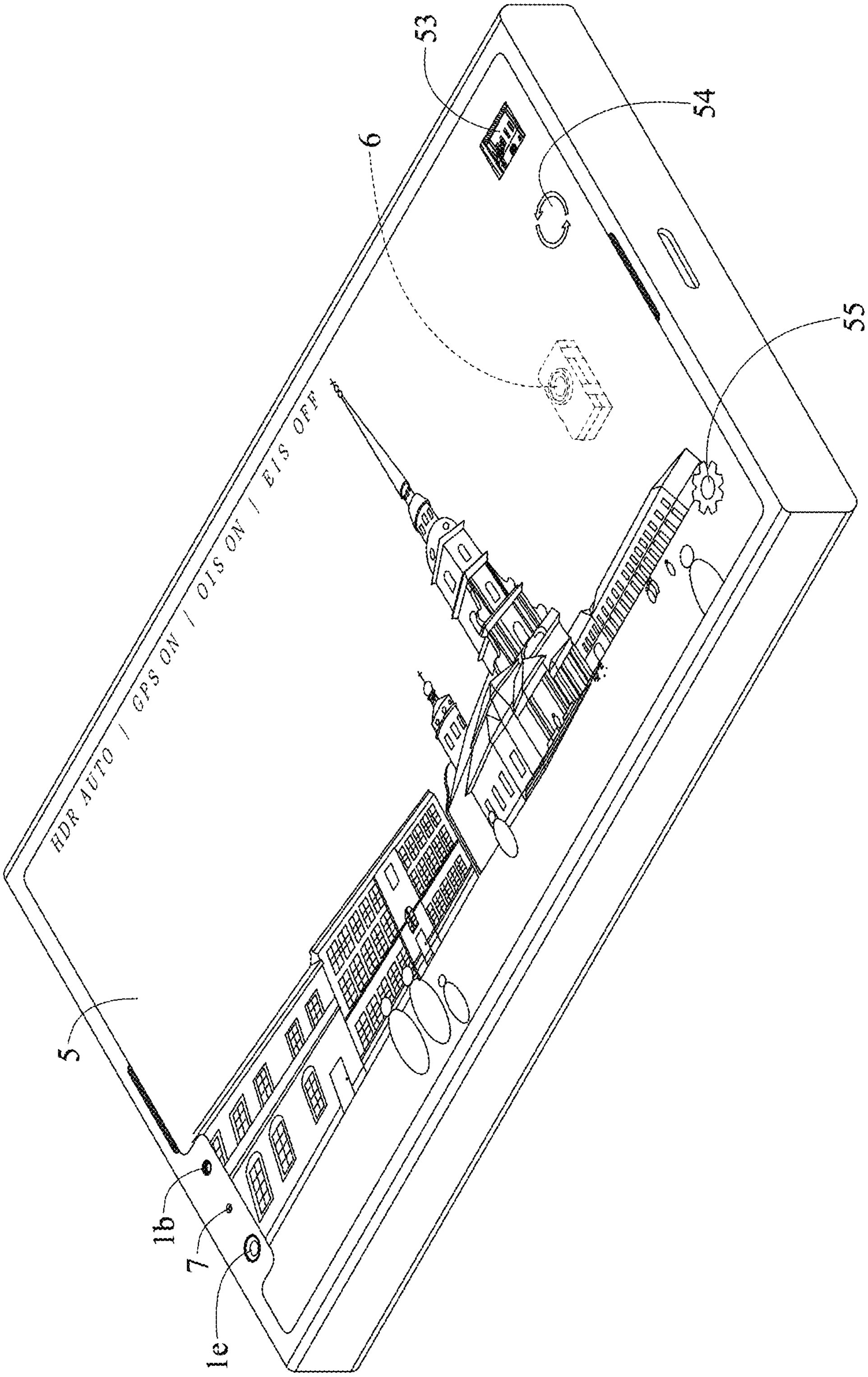
FIG. 21 is another perspective view of the electronic device in FIG. 20.
Figure 22:
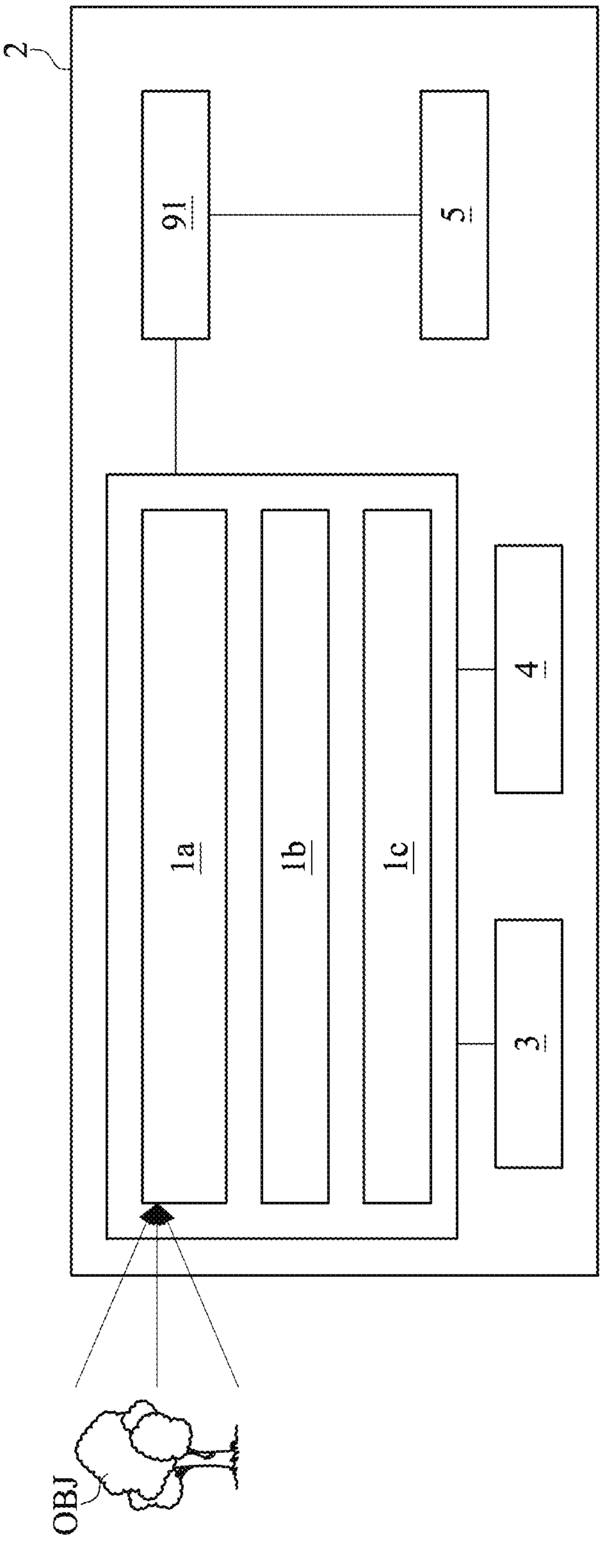
FIG. 22 is a block diagram of the electronic device in FIG. 20.

Please refer to FIG. 20 through FIG. 22. FIG. 20 is a perspective view of an electronic device according to the 4th embodiment of the present disclosure, FIG. 21 is another perspective view of the electronic device in FIG. 20, and FIG. 22 is a block diagram of the electronic device in FIG. 20.

In this embodiment, an electronic device 2 is a mobile device such as a computer, a smartphone, a smart wearable device, an aerial camera, a driving recorder and displayer, and the present disclosure is not limited thereto. The electronic device 2 includes a camera module 1*a*, a wide-angle camera module 1*b*, a macro-photo camera module 1*c*, a camera module 1*d*, a ToF (time of flight) camera module 1*e*, a flash module 3, a focus assist module 4, an image signal processor (not numbered), a display module 5, an image software processor (not numbered) and a biometric identification device 6. In addition, the camera module 1*a* is, for example, the camera module 1 as disclosed in the 1st embodiment, but the present disclosure is not limited thereto. Each of the camera modules 1*b*, 1*c*, 1*d* and 1*e* may be one of the camera modules as disclosed in the above embodiments of the present disclosure.

The camera module 1*a*, the camera module 1*b* and the camera module 1*c* are disposed on the same side of the electronic device 2. The camera module 1*d*, the ToF camera module 1*e* and the display module 5 are disposed on the opposite side of the electronic device 2. The display module 5 can be a user interface, such that the camera module 1*d* and the camera module 1*e* can be front-facing cameras of the electronic device 2 for taking selfies, but the present disclosure is not limited thereto.

In this embodiment, the camera module 1*a*, the camera module 1*b* and the camera module 1*c* have different fields of view, such that the electronic device 2 can have various magnification ratios so as to meet the requirement of optical zoom functionality. For example, the wide-angle camera module 1*b* has a relatively large field of view, and the image captured by the wide-angle camera module 1*b* can refer to FIG. 21 in which the display module 5 shows an image including the whole cathedral, surrounding buildings and people in front of the cathedral.

Figure 23:
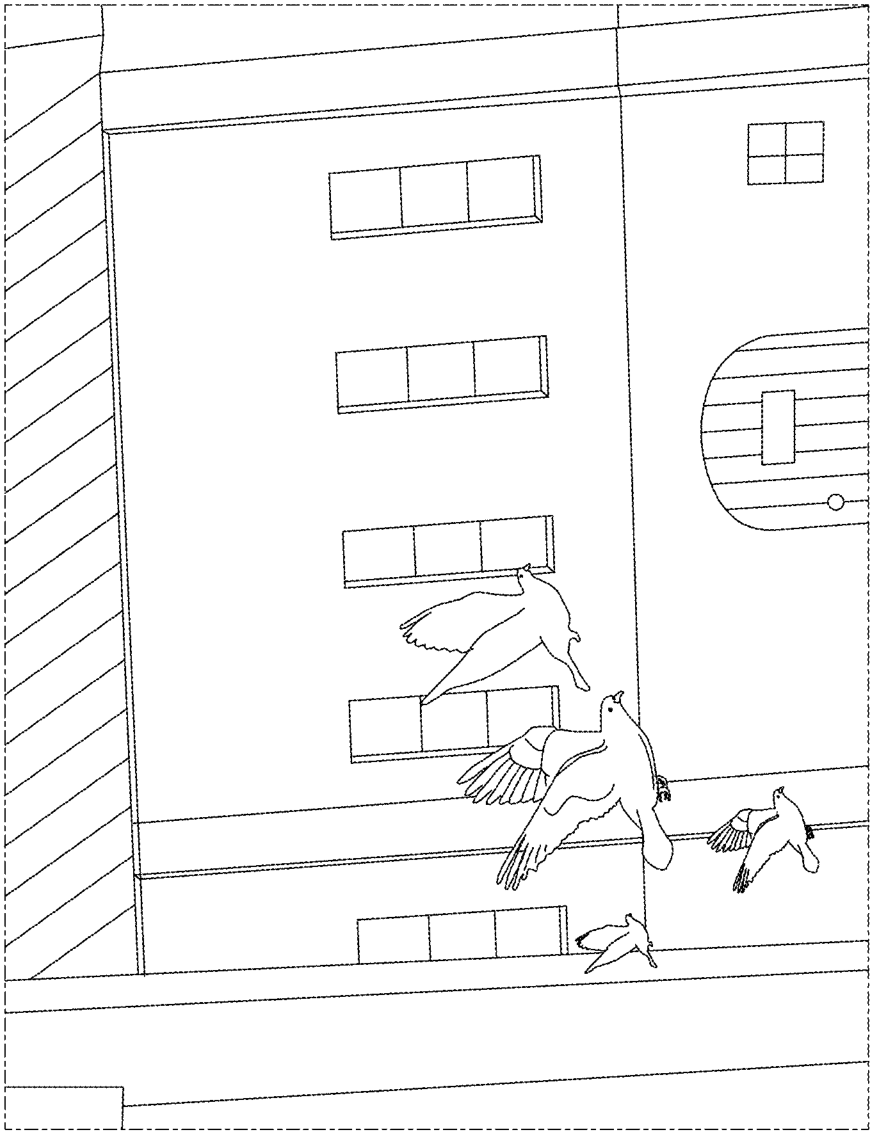
FIG. 23 shows an image captured by the electronic device in FIG. 20 with a light pass aperture module in the small aperture state.
Figure 24:
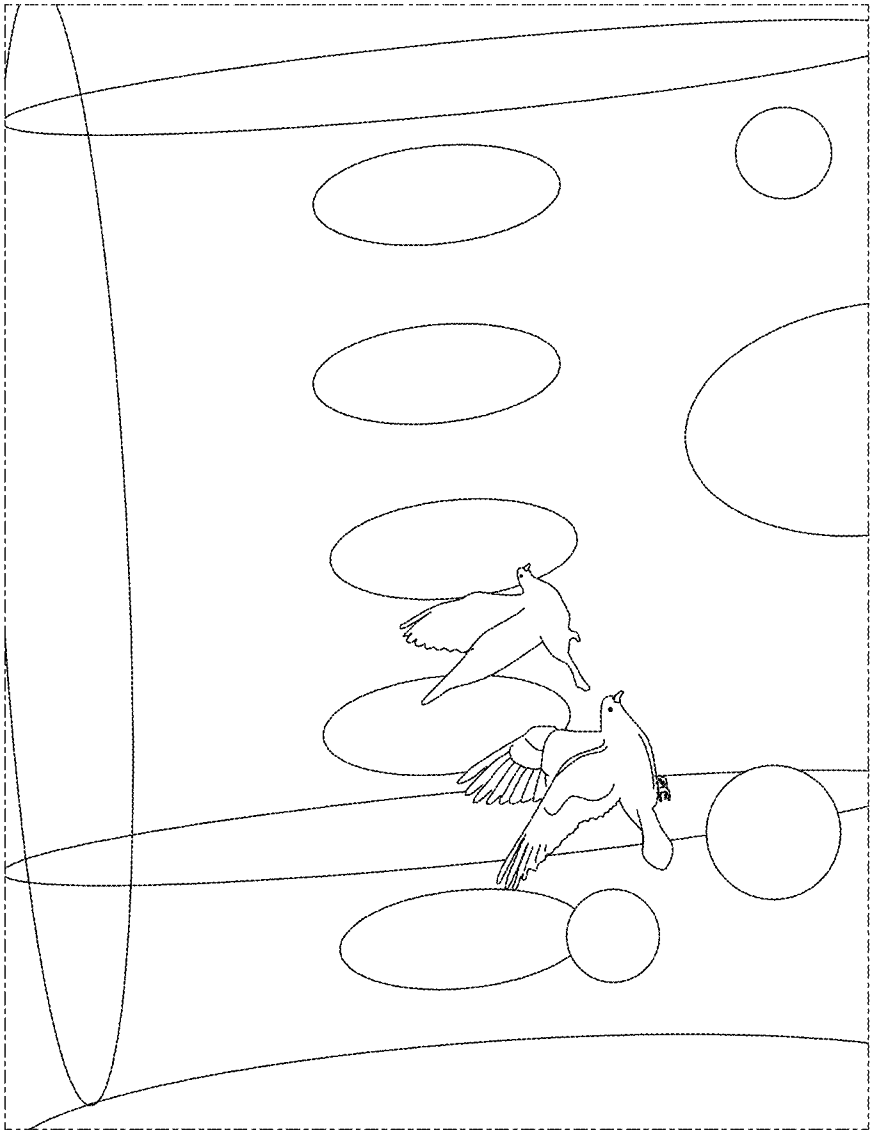
FIG. 24 shows an image captured by the electronic device in FIG. 20 with a light pass aperture module in the large aperture state.

The image captured by the camera module 1*a* having a variable light pass aperture with relatively small amount of light passing therethrough can refer to FIG. 23, and the image captured by the camera module 1*a* having a variable light pass aperture with relatively large amount of light passing therethrough can refer to FIG. 24. FIG. 23 shows an image captured by the electronic device in FIG. 20 with a light pass aperture module in the small aperture state, and FIG. 24 shows an image captured by the electronic device in FIG. 20 with a light pass aperture module in the large aperture state. The captured images as shown in FIG. 23 and FIG. 24 include birds flying in front of the cathedral. As shown in FIG. 23, the light pass aperture module in the small aperture state provides a relatively small light pass aperture, the image sensor receives less light, but the background in the image is relatively clear. As shown in FIG. 24, the light pass aperture module in the large aperture state provides a relatively large light pass aperture, the image sensor receives more light, but the background in the image is relatively blurry. When imaging, the camera module 1*a* having a variable light pass aperture can further perform optical zoom for imaged objects so as to obtain clearer images. In addition, the ToF camera module 1*e* can determine depth information of the imaged object. In this embodiment, the electronic device 2 includes multiple camera modules 1*a*, 1*b*, 1*c*, 1*d*, and 1*e*, but the present disclosure is not limited to the number and arrangement of camera modules.

When a user captures images of an object OBJ, light rays converge in the camera module 1*a*, the camera module 1*b* or the camera module 1*c* to generate images, and the flash module 3 is activated for light supplement. The focus assist module 4 detects the object distance of the imaged object OBJ to achieve fast auto focusing. The image signal processor is configured to optimize the captured image to improve image quality. The light beam emitted from the focus assist module 4 can be either conventional infrared or laser.

In addition, the light rays may converge in the camera module 1*d* or the camera module 1*e* to generate images. The electronic device 2 can include a reminder light 7 that can be illuminated to remind the user that the camera module 1*d* or the camera module 1*e* is working. The display module 5 can be a touch screen or physical buttons such as a zoom button 51 and a shutter release button 52. The user is able to interact with the display module 5 and the image software processor having multiple functions to capture images and complete image processing. The image processed by the image software processor can be displayed on the display module 5. The user can replay the previously captured image through an image playback button 53 of the display module 5, can choose a suitable camera module for shooting through a camera module switching button 54 of the display module 5, and can properly adjust shooting parameters according to current shooting situations through an integrated menu button 55 of the display module 5.

Further, the electronic device 2 further includes a circuit board 8, and the circuit board 8 carries a plurality of electronic components 9. The camera modules 1*a*, 1*b*, 1*c*, 1*d* and 1*e* are electrically connected to the electronic components 9 via connectors 81 on the circuit board 8. The electronic components 9 can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, and the present disclosure is not limited thereto.

The electronic components 9 can also include a storage unit, a random access memory for storing image information, a gyroscope, and a position locator for facilitating the navigation or positioning of the electronic device 2. In this embodiment, the electronic components 9 can be integrated into a single chip system 91, but the present disclosure is not limited thereto. In some other embodiments, the electronic components can also be integrated in the camera module or can also be disposed on one of the circuit boards. In addition, the user can use the biometric identification device 6 to turn on and unlock the electronic device 2.

The smartphone in this embodiment is only exemplary for showing the camera modules of the present disclosure installed in the electronic device 2, and the present disclosure is not limited thereto. The camera modules can be optionally applied to optical systems with a movable focus. Furthermore, the camera modules feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A light pass aperture module, in order along a central axis, comprising:

a blade assembly comprising a plurality of blades, wherein the plurality of blades form a light pass aperture, and the light pass aperture is variable in size with the central axis as a center; and a cap covering the blade assembly, wherein the cap has a through hole, and the through hole is disposed corresponding to the light pass aperture;

wherein the cap comprises a plastic surface, the plastic surface is disposed corresponding to one of the plurality of blades, the plastic surface has a side facing toward the one of the plurality of blades, and the plastic surface is closer to the one of the plurality of blades than the through hole;

wherein, in a direction parallel to the central axis, a gap between the plastic surface and the one of the plurality of blades is Gap, a thickness of the one of the plurality of blades is Thi, and the following condition is satisfied:

$$0.001 \leq Gap/Thi \leq 0.995.$$

2. The light pass aperture module according to claim 1, wherein the cap is a stamped element.

3. The light pass aperture module according to claim 1, further comprising a base being fixed relative to the cap;

wherein the base comprises a first axial structure, the one of the plurality of blades is movable within a specific range according to the first axial structure so as to vary a size of the light pass aperture.

4. The light pass aperture module according to claim 3, wherein the base comprises a supporting surface, the supporting surface is further away from the plastic surface than the one of the plurality of blades, and the one of the plurality of blades is disposed on the supporting surface;

wherein, in a direction parallel to the central axis, a distance between the plastic surface and the supporting surface is Dis, the thickness of the one of the plurality of blades is Thi, and the following condition is satisfied:

$$1.001 \leq Dis/Thi \leq 1.995.$$

5. The light pass aperture module according to claim 3, wherein the plastic surface of the cap comprises a counterpart hole, and the counterpart hole is disposed corresponding to the first axial structure.

6. The light pass aperture module according to claim 5, wherein the one of the plurality of blades comprises a driving hole, the driving hole is corresponding to the counterpart hole, and the first axial structure passes through the driving hole.

7. The light pass aperture module according to claim 3, further comprising a rotating element, and the rotating element is rotatable around the central axis;

wherein the rotating element comprises a second axial structure, the one of the plurality of blades is in a linkage movement with the second axial structure so as to vary a size of the light pass aperture.

8. The light pass aperture module according to claim 7, wherein the plastic surface of the cap comprises a counterpart hole, and the counterpart hole is disposed corresponding to the second axial structure.

9. The light pass aperture module according to claim 8, wherein the one of the plurality of blades comprises a driving hole, the driving hole is corresponding to the counterpart hole, and the second axial structure passes through the driving hole.

10. The light pass aperture module according to claim 7, further comprising a driving magnet and a driving coil, wherein the driving magnet is disposed on the rotating element, and the driving coil and the driving magnet are disposed corresponding to each other so as to rotate the rotating element.

11. The light pass aperture module according to claim 10, further comprising a position sensing circuit, wherein the position sensing circuit is disposed corresponding to the driving magnet so as to sense a position of the rotating element.

12. The light pass aperture module according to claim 10, further comprising a ferromagnetic element, wherein the ferromagnetic element is disposed on the base and corresponding to the driving magnet;

wherein the ferromagnetic element is further away from the cap than the rotating element so as to maintain a relative position between the rotating element and the cap.

13. The light pass aperture module according to claim 7, further comprising a plurality of rolling elements, wherein the plurality of rolling elements are disposed between the base and the rotating element so as to make the rotating element rotatable.

14. The light pass aperture module according to claim 1, wherein onto a plane perpendicular to the central axis, a projection of the plastic surface is smaller than a projection of the one of the plurality of blades.

15. The light pass aperture module according to claim 1, wherein an arithmetic average roughness (Ra) of the side is smaller than 0.25 micrometers (μm).

16. The light pass aperture module according to claim 1, wherein the one of the plurality of blades has a smooth surface facing toward the plastic surface, and an arithmetic average roughness (Ra) of the smooth surface is smaller than 0.25 μm.

17. A camera module, comprising:

the light pass aperture module according to claim 1; and a lens assembly disposed corresponding to the light pass aperture in the central axis.

18. The camera module according to claim 17, wherein the light pass aperture is an aperture stop of the camera module.

19. An electronic device, comprising:

the camera module according to claim 17.

* * * * *